(12) United States Patent
Izumi

(10) Patent No.: US 9,513,462 B2
(45) Date of Patent: Dec. 6, 2016

(54) LENS BARREL AND IMAGING APPARATUS

(71) Applicant: CANON KABUSHIKI KAISHA, Tokyo (JP)

(72) Inventor: Mitsuhiro Izumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 14/156,831

(22) Filed: Jan. 16, 2014

(65) Prior Publication Data

US 2014/0204482 A1    Jul. 24, 2014

(30) Foreign Application Priority Data

Jan. 18, 2013 (JP) .................................. 2013-006890
Feb. 21, 2013 (JP) .................................. 2013-032013

(51) Int. Cl.
*G02B 7/02* (2006.01)
*G02B 7/10* (2006.01)

(52) U.S. Cl.
CPC ...................................... *G02B 7/102* (2013.01)

(58) Field of Classification Search
CPC ......... G02B 7/021; G02B 7/02; G02B 25/002; G02B 7/102; G02B 7/023; G03F 7/70825
USPC .......................... 359/811, 817, 819, 822, 823
See application file for complete search history.

(56) References Cited

U.S. PATENT DOCUMENTS

| | | | | |
|---|---|---|---|---|
| 5,130,851 | A | * | 7/1992 | Shirie ........................ 359/700 |
| 2004/0228626 | A1 | | 11/2004 | Endo |
| 2008/0106788 | A1 | | 5/2008 | Yasutomi |

FOREIGN PATENT DOCUMENTS

| | | |
|---|---|---|
| CN | 101027604 A | 8/2007 |
| CN | 101644819 A | 2/2010 |
| JP | H08-094905 A | 4/1996 |
| JP | 2000-304999 A | 11/2000 |
| JP | 2006-039405 A | 2/2006 |
| JP | 2010066412 A | 3/2010 |

* cited by examiner

*Primary Examiner* — James Greece
(74) *Attorney, Agent, or Firm* — Canon U.S.A. Inc., IP Division

(57) ABSTRACT

The lens barrel includes a stationary tube, a cam ring, and a rectilinear motion tube. The rectilinear motion tube is moved by the rotation of the cam ring in the optical axis direction. A lens frame holding a lens is moved by a driving unit (feed screw and a motor) in the optical axis direction. The stationary tube includes a main guide bar in the optical axis direction. The rectilinear motion tube includes another main guide bar in the optical axis direction. The lens frame includes first and second fitting portions slidably supported by the main guide bars in the optical axis direction, and the first and second fitting portions are disposed separately in the optical axis direction, and the main guide bars are disposed in different positions around the optical axis.

8 Claims, 29 Drawing Sheets

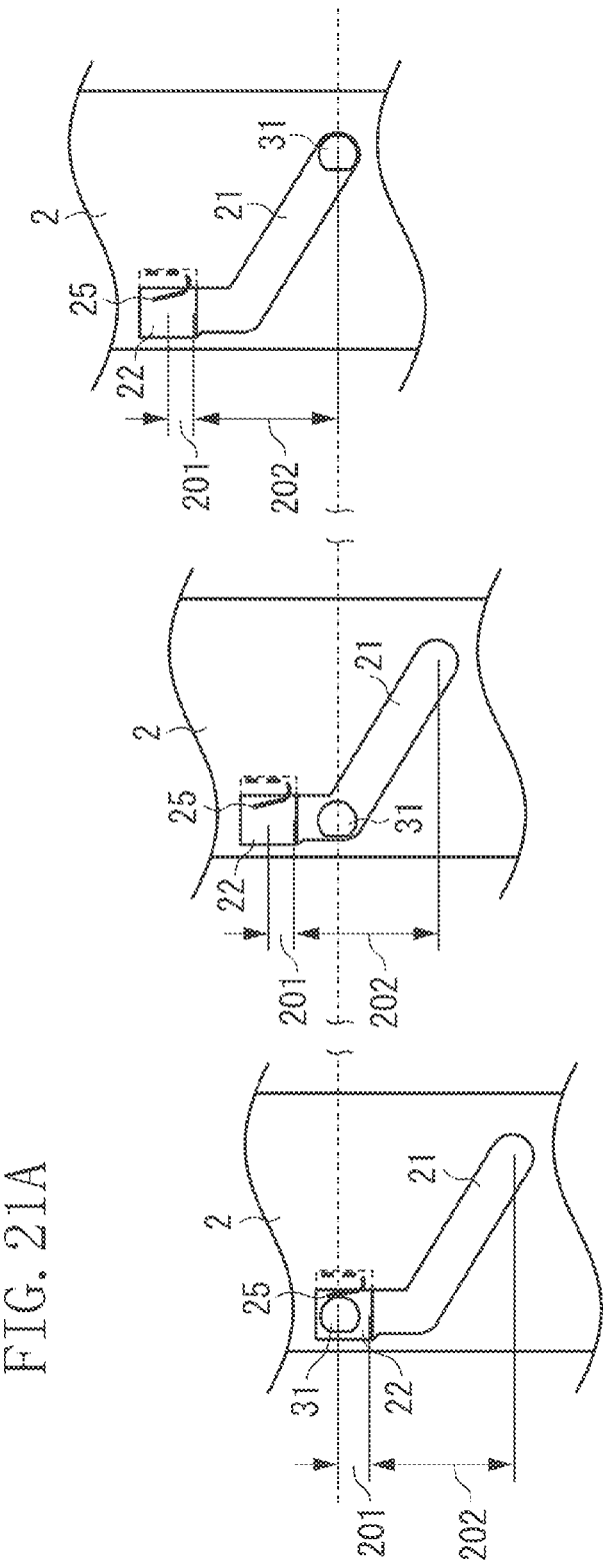

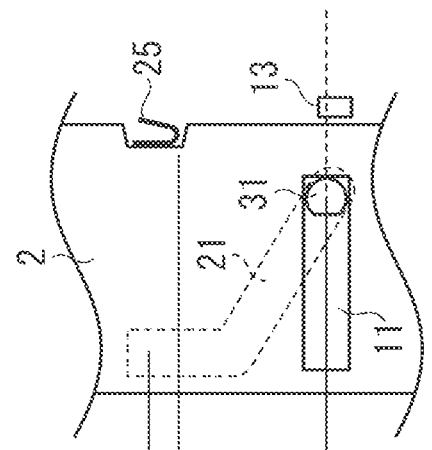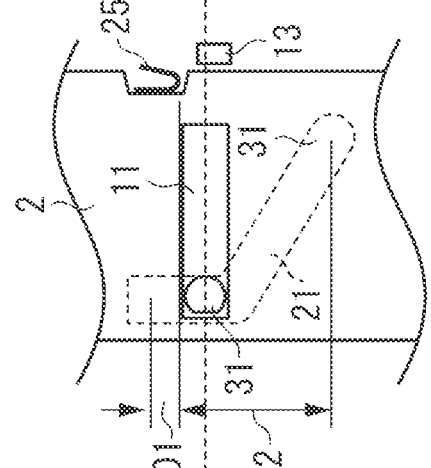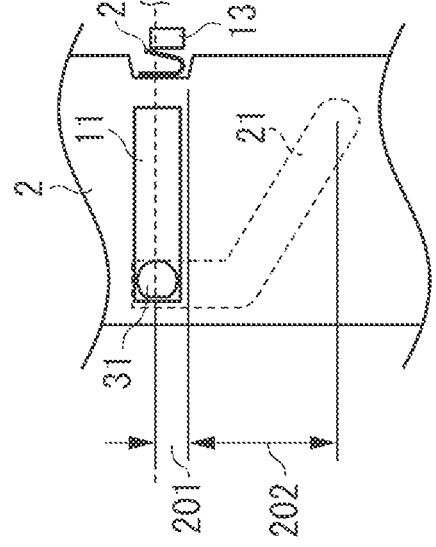

LENS BARREL AND IMAGING APPARATUS

BACKGROUND OF THE INVENTION

Field of the Invention

The present invention relates to a lens barrel of a retractable lens structure used for cameras such as a digital video camera, and an imaging apparatus.

Description of the Related Art

In digital video cameras, such a structure is known in which a guide bar is used to hold a lens frame in order to reduce tilt of the lens while zooming as much as possible. Holding portions of the lens frame can be arranged separately in a longitudinal direction of a guide bar. As a result, tilt of the lens can be restricted and the shift of the image can be prevented. However, the long guide bar causes the lens barrel to limit the size thereof to be smaller. Japanese Patent Application Laid-open No. 8-94905 discusses a driving mechanism for a movable member using a plurality of guide shafts and a linear motor, in a retractable lens barrel for a video camera.

In the structure discussed in Japanese Patent Application Laid-open No. 8-94905, the length of the guide bar holding the zoom lens is restricted within the entire length of the lens barrel in a retracted state. Therefore, compared with a non-retractable lens barrel, the moving range of the lens while zooming and the optical element holding accuracy are restricted.

SUMMARY OF THE INVENTION

The present invention is directed to a lens barrel including an optical element movable in an optical axis direction and a driving mechanism thereof, capable of keeping a moving range of the optical element and optical element holding accuracy when capturing an image, and reducing an entire length of the lens barrel when not capturing an image.

According to an aspect of the present invention, a lens barrel includes a lens holding member, a first lens barrel holding a first guide member, a second lens barrel holding a second guide member, wherein one end of the lens holding member is held by the first guide member, and the other end of the lens holding member is held by the second guide member, wherein the second guide member protrudes on an object side with respect to the first guide member in an optical axis direction with a shift from a retracted state to a ready for imaging state, wherein, in the imaging state, the lens holding member moves in the optical axis direction guided by the first guide member and the second guide member which protrudes to the object side from the first guide member.

According to the present invention, when capturing an image, the moving range and the optical element holding accuracy of the optical element can be maintained, and when not capturing an image, the entire length of the lens barrel can be reduced.

Further features of the present invention will become apparent from the following description of exemplary embodiments with reference to the attached drawings.

BRIEF DESCRIPTION OF THE DRAWINGS

FIGS. 21A, 21B, and 21C are development views illustrating a relationship between a cam groove and a cam follower according to the third exemplary embodiment of the present invention.

FIGS. 23A, 23B, and 23C are development views illustrating a relationship between a cam groove and a cam follower according to the fourth exemplary embodiment of the present invention.

FIGS. 24A and 25B are diagrams illustrating a relationship of forces when locking according to a fifth exemplary embodiment of the present invention.

FIGS. 25A, 25B, 25C, and 25D are diagrams illustrating a relationship between a cam follower and a locking spring according to the fifth exemplary embodiment of the present invention.

DESCRIPTION OF THE EMBODIMENTS

Various exemplary embodiments, features, and aspects of the invention will be described in detail below with reference to the drawings. The present invention is applicable to a lens barrel including a mechanism capable of moving an optical element such as a zoom lens and a focus lens in an optical axis direction, and an optical apparatus and an imaging apparatus including the lens barrel.

Referring to FIG. 1 to FIG. 9, a lens barrel according to a first exemplary embodiment of the present invention is described below.

Figure 1:
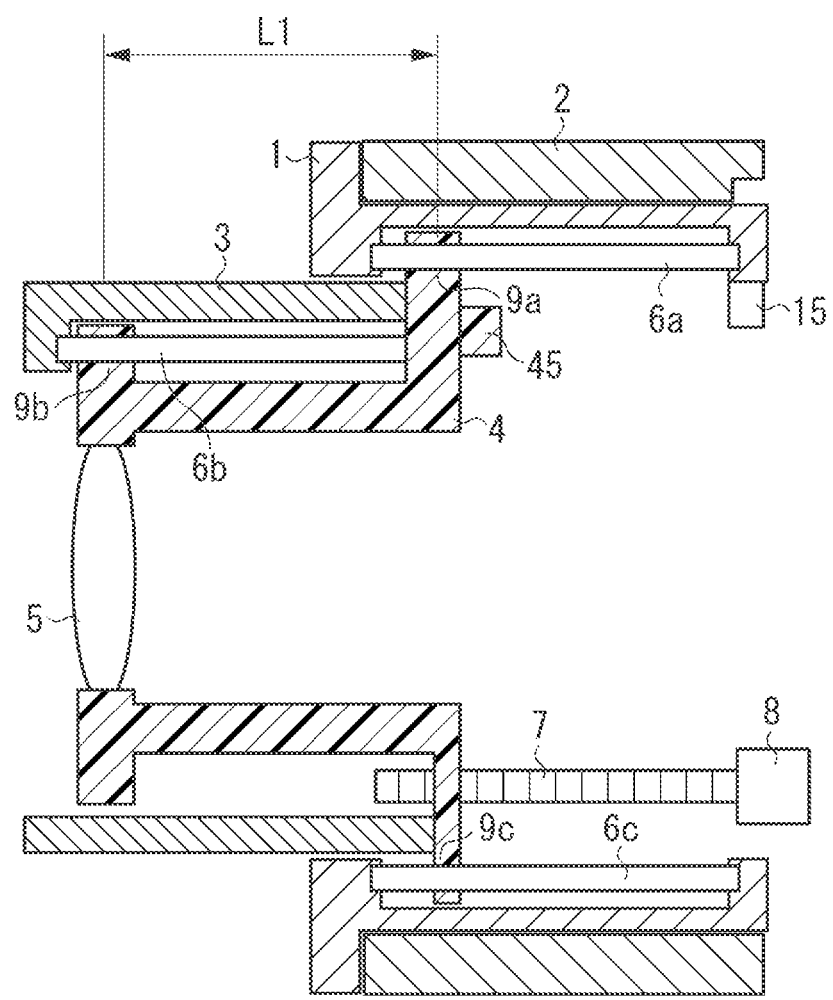
FIG. 1 is a cross sectional view illustrating, in cooperation with FIGS. 2A, 2B, and 2C to 9, a lens barrel when capturing an image according to a first exemplary embodiment of the present invention.

FIG. 1 is a cross sectional view along an optical axis direction illustrating a lens barrel in a usable state (ready for image capturing) according to the present exemplary embodiment. Hereinbelow, a position where an optical element movable along an optical axis direction is extended on the object side is defined as a ready-for-imaging position, and a position where the optical element is retracted on an image plane side in a retracted state is defined as a retracted position. The object side (i.e., left side in FIG. 1) is defined as an optical axis direction front side, the image plane side (i.e., right side in FIG. 1) is defined as an optical axis direction back side, and a near side to the optical axis is defined as an inner side. The positional relationship of the optical elements will be described based on the definition.

The lens barrel includes a stationary tube (first barrel) and a movable unit. The movable unit movable relative to a stationary tube 1 includes a cam member (cam ring 2), a rectilinear motion member (rectilinear motion tube 3, i.e., second lens barrel), and a holding member (lens frame 4). The cam ring 2 is a third barrel attached to the stationary tube 1 to be movable around the optical axis, and is driven to be rotated by a drive source such as a motor (not illustrated). For example, when a stepping motor is used as a drive source, the rotation amount of the cam ring 2 is controlled by counting pulses.

Figure 2A:
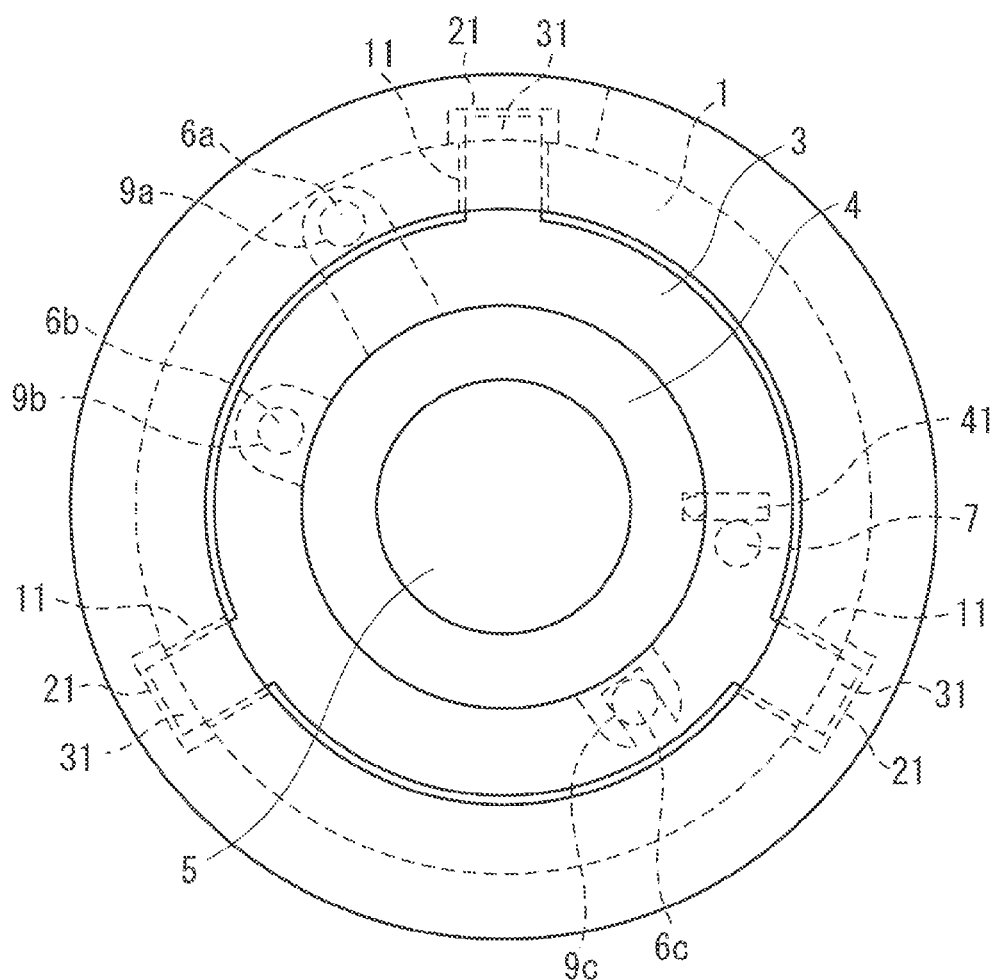
FIG. 2A is a front view of the lens barrel.
Figure 4:
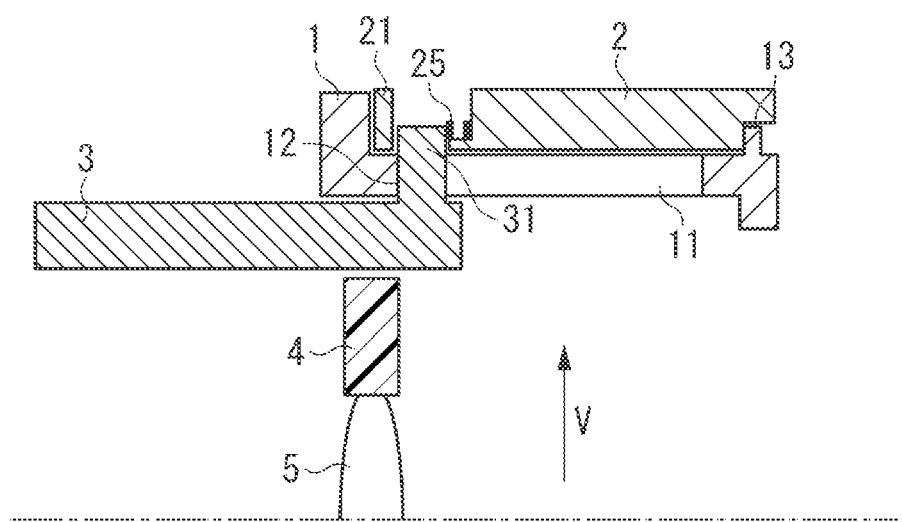
FIG. 4 is a cross sectional view illustrating a cam structure when capturing an image.
Figure 5A:
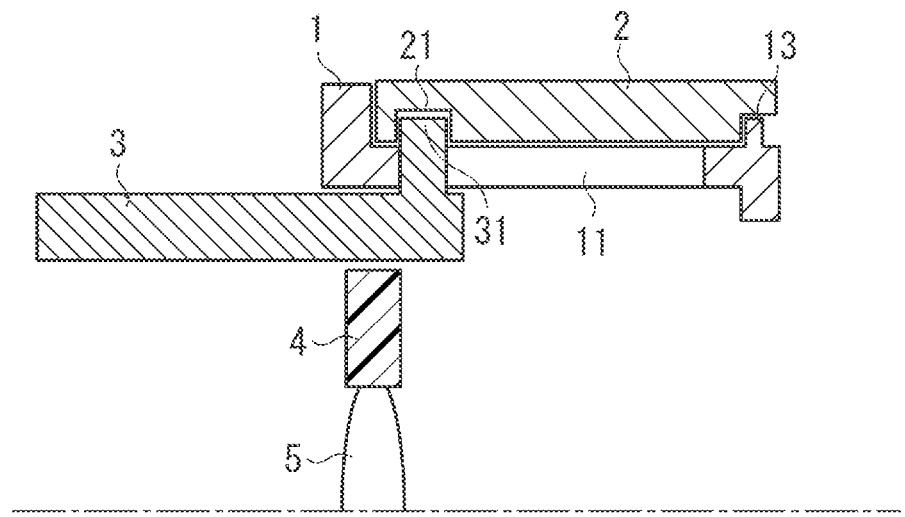
FIGS. 5A and 5B are cross sectional views of a cam structure illustrating a retracting operation of the lens barrel.
Figure 5B:
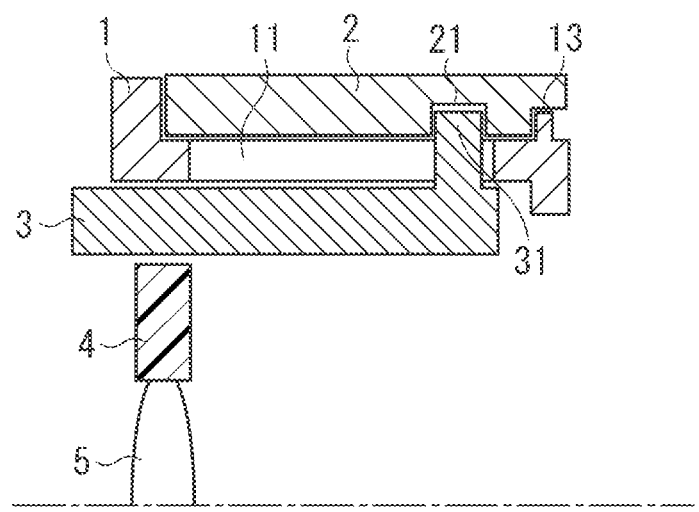

FIG. 2A is a front view of the lens barrel seen from the optical axis direction front side. FIG. 3 is a cross sectional view illustrating a retracting operation of the lens barrel. FIG. 4 is a cross sectional view illustrating a cam structure. As illustrated in FIG. 4, the movement of the cam ring 2 in the optical axis direction is restricted by a bayonet claw 13 of the stationary tube 1 in a state where the cam ring 2 is built in an imaging apparatus, including the retracted state of the lens barrel when not capturing an image and extended state of the lens barrel when capturing an image.

Rectilinear motion guides 11 (refer to FIG. 2A and FIG. 4) are provided on the inner peripheral surface of the stationary tube 1, and are groove portions provided along the optical axis direction according to the present exemplary embodiment. A rectilinear motion tube 3 is moved by the rotation of the cam ring 2 in the optical axis direction. On the outer peripheral surface of the rectilinear motion tube 3 at the back end side, a plurality of cam followers 31 is provided. The cam followers 31 protrude outward. The rectilinear motion guides 11 restrict the rotation of the cam followers 31 around the optical axis. As illustrated in FIG. 2A, the plurality of rectilinear motion guides 11 is provided at three positions in a circumferential direction around the optical axis, to restrict movement of the rectilinear motion tube 3 in all directions other than the optical axis direction. The three cam followers 31 are provided on the rectilinear motion tube 3 respectively corresponding to the rectilinear motion guides 11. The cam followers 31 abut against cam grooves 21 to move the rectilinear motion tube 3 back and forth along the cam grooves 21 in the optical axis direction caused by the rotation of the cam ring 2.

Three guide bars 6a, 6b, and 6c illustrated in FIG. 1 are guide members configuring a guide portion for the lens frame 4. In the present exemplary embodiment, the main guide bars 6a and 6b, and the sub guide bar 6c are used. Hereinbelow, the main guide bar 6a (first guide bar) is also referred to as a fixed guide bar, and the main guide bar 6b (second guide bar) is also referred to as a movable guide bar. Each of the fixed guide bar 6a, the movable guide bar 6b, and the sub guide bar (third guide bar) 6c is formed of a metallic material (e.g., stainless steel) in a circular cylindrical shape.

The fixed guide bar 6a constituting a first guide portion and the sub guide bar 6c constituting a third guide portion are attached to the stationary tube 1 and held so as to extend in parallel to the optical axis direction. The movable guide bar 6b constituting the second guide portion are attached to the rectilinear motion tube 3 and held so as to extend in parallel to the optical axis direction. As illustrated in FIG. 2A, the movable guide bar 6b and the fixed guide bar 6a are arranged on a circle around the optical axis in a different phase relationship. In other words, a plane including a central axis of the movable guide bar 6b and the optical axis, and a plane including a central axis of the fixed guide bar 6a and the optical axis are arranged with a predetermined angle therebetween. The reason of this arrangement is that, in order to constitute a retractable structure, it is difficult to arrange the two main guide bars to be overlapped in the front view in FIG. 2A. Further, the movable guide bar 6b and the fixed guide bar 6a are different in distance from the optical axis, because they are fixed to different parts.

By arranging the sub guide bar 6c in a position as far as possible to the movable guide bar 6b and the fixed guide bar 6a, rotational backlash around the optical axis can be reduced. As illustrated in FIG. 2A, the sub guide bar 6c is positioned at an opposite side of the fixed guide bar 6a across the optical axis.

A first fitting portion 9a, a second fitting portion 9b, a third fitting portion 9c are provided on the lens frame 4 respectively for the fixed guide bar 6a, the movable guide bar 6b, and the sub guide bar 6c. The first fitting portion 9a is a first guided portion guided by the fixed guide bar 6a. The second fitting portion 9b is a second guided portion guided by the movable guide bar 6b. The third fitting portion 9c is a third guided portion guided by the sub guide bar 6c.

Figure 2B:
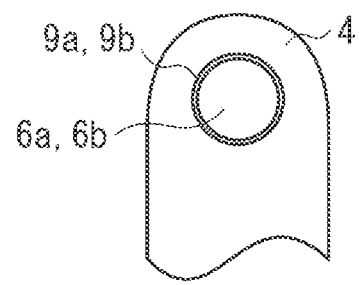
FIGS. 2B and 2C are cross sectional views illustrating a fitting state of a guide bar.

The lens frame 4 is a holding member that hold a lens 5. The second fitting portion 9b is fitted with the movable guide bar 6b to restrict the movement of the lens frame 4 in a plane orthogonal to the optical axis so that the lens frame 4 can move back and forth in the optical axis direction. The first fitting portion 9a is fitted with the fixed guide bar 6a to restrict the movement of the lens frame 4 in a plane orthogonal to the optical axis so that the lens frame 4 can move back and forth in the optical axis direction. FIG. 2B is a cross sectional view of the first fitting portion 9a and the second fitting portion 9b cut by a plane orthogonal to the optical axis. The first fitting portion 9a and the second fitting portion 9b are provided with shaft hole portions respectively fitted with the fixed guide bar 6a and the movable guide bar 6b. The movement of the lens frame 4 is restricted in a plane orthogonal to the optical axis, and the lens frame 4 is guided along the optical axis direction. Further, as illustrated in FIG. 1, the first fitting portion 9a and the second fitting portion 9b are positioned separately to each other in the optical axis direction. The longer the separation distance between the first fitting portion 9a and the second fitting portion 9b is (see L1 in FIG. 1), less easily the lens 5 held by the lens the frame 4 tilts with respect to the fixed guide bar 6a and the movable guide bar 6b.

Figure 2C:
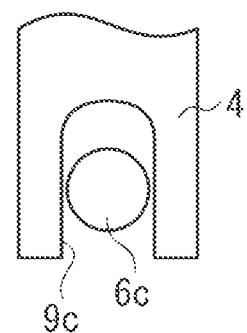
Figure 3A:
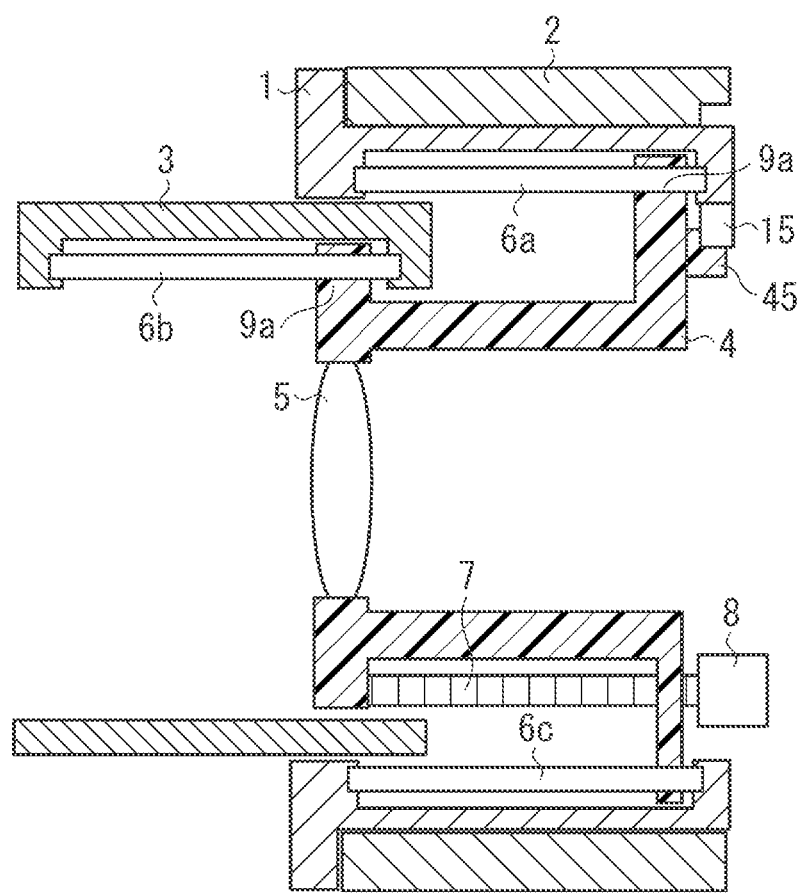
FIGS. 3A and 3B are cross sectional views of the lens barrel illustrating a retracting operation of the lens barrel.
Figure 3B:
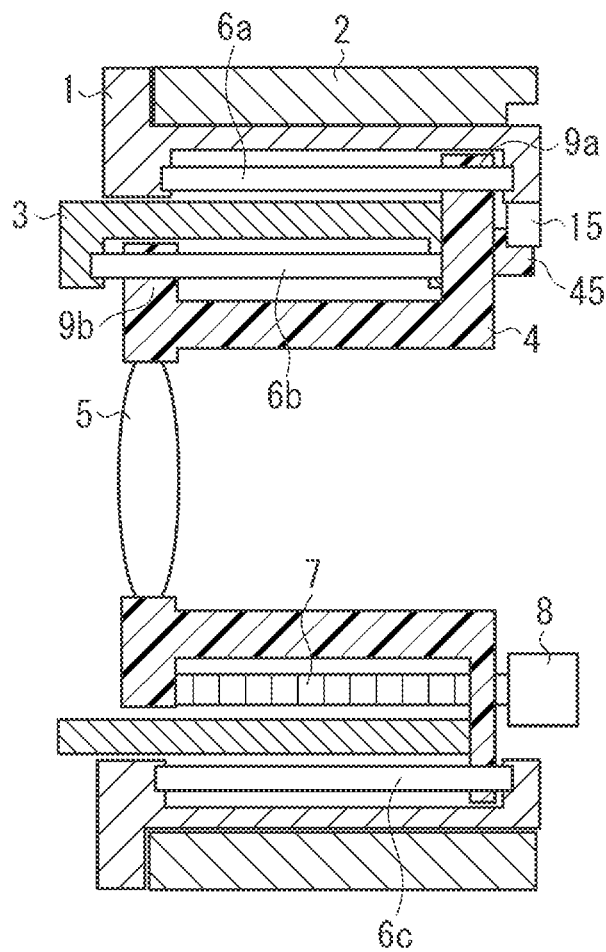

The third fitting portion 9c is fitted with the sub guide bar 6c with a small gap so that the lens frame 4 can move back and forth in the optical axis direction. The third fitting portion 9c is, in order to avoid multiple fittings with the first fitting portion 9a and the second fitting portion 9b, in a fitting state so as to restrict the rotation direction of the lens frame 4 around the optical axis. Specifically, as illustrated in FIG. 2C, the third fitting portion 9c has a notch portion to guide the lens frame 4 only in the direction restricting the rotation in a plane orthogonal to the optical axis. With this structure, decentering of the lens frame 4 in the plane orthogonal to the optical axis is restrained.

As described above, by using the three guide bars, decentering and tilting of the lens 5 held by the lens frame 4 do not easily occur with respect to the optical axis direction, holding accuracy of the lens 5 with respect to the optical axis direction can be maintained and can move back and forth only in the optical axis direction.

Figure 7A:
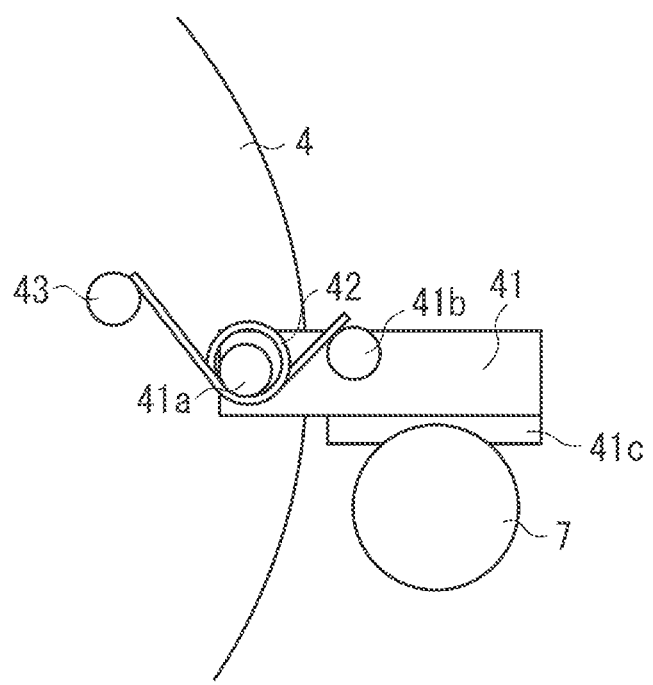
FIGS. 7A and 7B illustrate a rack portion.

Next, the driving unit for moving the lens frame 4 back and forth in the optical axis direction will be described below with reference to FIGS. 7A and 7B. FIG. 7A illustrates the driving unit viewed from the optical axis direction, and FIG. 7B illustrates a rack 41 viewed from a direction orthogonal to the optical axis.

The rack 41 provided on the lens frame 4 is rotatable around the optical axis with a rotation shaft 41a as a supporting point. The rack 41 is provided on the lens frame 4 to be movable together with the lens frame 4 in the optical axis direction. A coil portion of a torsion spring 42 is attached to a rotation shaft 41a. One arm portion of arm portions of the torsion spring 42 is attached to a spring hook portion 41b of the rack 41, and the other arm portion is attached to a spring hook portion 43 provided on the lens frame 4. The torsion spring 42 is a urging member for applying to the rack 41 a clockwise rotational force in the paper surface of FIG. 7.

Figure 7B:
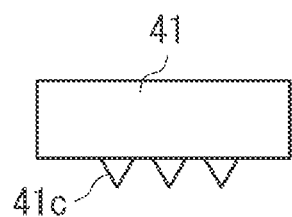

At the contact portion of the rack 41 and a feed screw 7, as illustrated in FIG. 7B, a threaded portion 41c is formed. The pitch of the threaded portion 41c is set to be the same as the screw-pitch of the feed screw 7, and the rack 41 and the feed screw 7 are screwed together. The feed screw 7 is provided on the rotation shaft of a motor 8 (see FIGS. 1, 3A, and 3B), and the feed screw 7 is rotated together with the rotation of the motor 8. With the configuration described above, the rack 41 configures a driving mechanism for not restricting the lens frame 4 from moving in an in-plane direction orthogonal to the optical axis to allow the lens frame 4 to move only in the optical axis direction. As a result, the lens frame 4 can move back and forth in the optical axis direction without being interfered with the restriction by the fitting with the guide bar.

For example, when a stepping motor is used as the motor 8, the relative amount of movement of the lens frame 4 moving along the optical axis direction can be detected by counting the number of pulses. A position detection unit 15 using a photointerrupter (see FIGS. 1, 3A, and 3B), for example, is mounted on the inner periphery of the stationary tube 1 on the rear end side thereof. A light-shielding portion 45 is attached on the rear end face of the lens frame 4. The position detection unit 15 detects the position in the optical axis direction at which the light-shielding portion 45 overlaps the position detection unit 15. Using the position detection unit 15 and the light-shielding portion 45, a drive control unit (not illustrated) manages the absolute position of the lens frame 4 in the optical axis direction. The drive control unit counts the number of pulses of the motor 8 after detecting the absolute position of the lens frame 4 in the optical axis direction to detect the position of the lens frame 4 in the optical axis direction at any time.

Figure 8A:
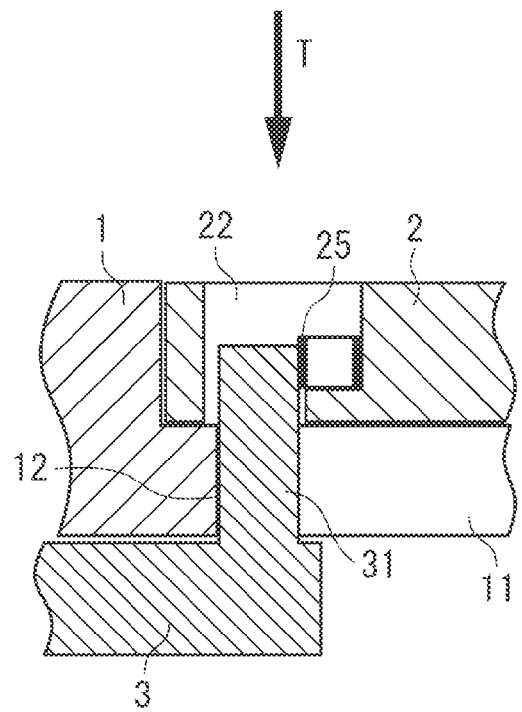
FIGS. 8A and 8B illustrate a lock portion.
Figure 8B:
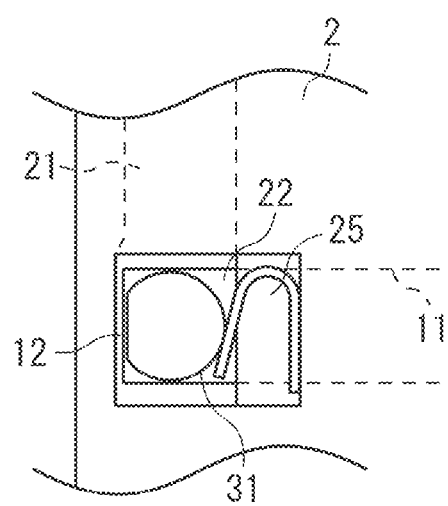

Next, the locking structure for prohibiting the movement of the rectilinear motion tube 3 in the extended state of the rectilinear motion tube 3 will be described. The lens barrel includes a lock mechanism for the rectilinear motion tube 3 to stabilize the relative positional accuracy between the fixed guide bar 6a and the movable guide bar 6b. Referring to FIGS. 8A and 8B, the lock mechanism will be described in detail. FIG. 8A is a cross sectional view along the optical axis direction illustrating a state where the rectilinear motion tube 3 is locked in a ready-for-imaging state. FIG. 8B is an arrow view seen from a direction indicated by an arrow T in FIG. 8A.

A locking spring 25 is attached in the cam groove 21 of the cam ring 2 by screwing or bonding. A through hole portion 22 is provided on the cam ring 2 so that the locking spring 25 can be inserted easily. As illustrated in FIG. 8B, the locking spring 25 is formed in U-shape, and urges the cam follower 31 in a direction in which the U-shape is opened. The space of the U-shape of the locking spring 25 becomes wider as approaching the tip end thereof. The locking spring 25 is attached in a state where the end portion thereof closer to the cam groove 21 is opened toward the left side in FIG. 8B. In the ready-for-imaging state, the cam follower 31 is not in contact with the cam groove 21, and is urged toward the left side in FIG. 8B by the force of the locking spring 25. The urged cam follower 31 is pressed against an abutting face portion 12 of the rectilinear motion guide 11. The abutting face portion 12 is an end face portion of the front end side forming the rectilinear motion guide 11. The cam follower 31 is not formed in circular cylindrical shape, and as illustrated in FIG. 8B, the cam follower 31 has a planar portion on the side contacting the abutting face portion 12 of the stationary tube 1. The planar portion of the cam follower 31 and the abutting face portion 12 of the stationary tube 1 are processed in advance to secure relative accuracy. In a state where the cam follower 31 is pressed against the abutting face portion 12 by the force of the locking spring 25, the relative accuracy between the movable guide bar 6b and the fixed guide bar 6a can be sufficiently secured. In the present exemplary embodiment, the three cam followers 31 are arranged circumferentially around the optical axis (see FIG. 2A), the locking springs 25 are arranged at three positions in the phases corresponding to the three cam followers 31. As described above, in the ready-for-imaging state, since the relative positional accuracy between the movable guide bar 6b and the fixed guide bar 6a is secured, the lens frame 4 can be moved back and forth in the optical axis direction with high accuracy.

Figure 9:
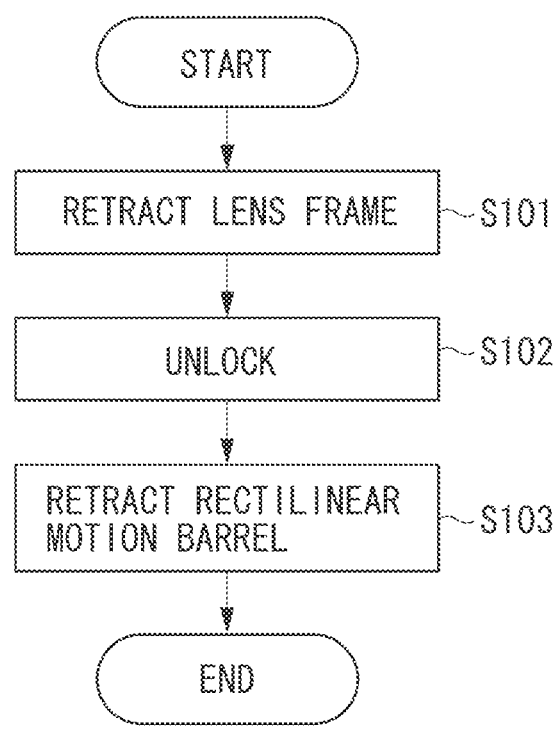
FIG. 9 is a flowchart illustrating the retracting operation.

Next, referring to FIG. 9, the retracting operation of the lens barrel will be described. It is assumed that, at the starting time point of the sequence, the lens barrel is in a ready-for-imaging state, and the lens 5 is located at the imaging position. Hereinbelow, the retracting operation while shifting from the ready-for-imaging state to the not ready-for-imaging state, will be described.

In step S101, the drive control unit controls the motor 8 to operate, and moves the lens frame 4 to the end position of the image plane side. The lens barrel has come into the state illustrated in FIGS. 3A and 5A. The drive control unit can perform the operation control of the motor 8 according to the number of the pulse count value required to move the lens frame 4, since the drive control unit grasps the position of the lens frame 4 by the pulse count value of the motor 8. In the present exemplary embodiment, the position detection unit 15 is disposed on the near side to the image plane (see FIGS. 1 and 3). Therefore, even if any deviation in the pulse count information of the motor 8 occurs by some reason, the relationship between the pulse count value and the absolute position can be corrected by the drive control unit recognizing the absolute position of the lens frame 4 in the optical axis direction at the time the lens frame 4 has come near the image plane side.

Figure 6A:
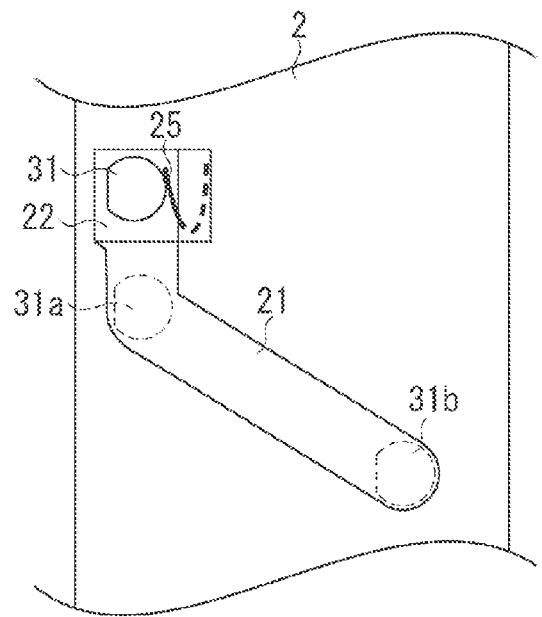
FIGS. 6A and 6B are diagrams illustrating the cam and a rectilinear motion barrel.
Figure 6B:
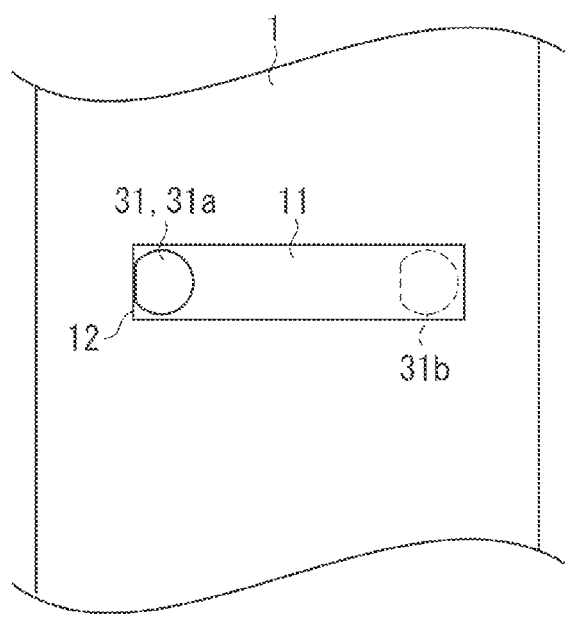

Next, in step S102, the lock release operation is performed with the rotation of the cam ring 2. As illustrated in FIG. 6A, in the ready-for-imaging state, the position of the cam follower 31 is located in the through hole portion 22 (see solid line portion). When the cam ring 2 is rotated with a driving mechanism (not illustrated), the locking spring 25 is also rotated together with the cam ring 2. As a result, the pressing force by the locking spring 25 is released, and the cam follower 31 is moved to a position 31a illustrated by a broken line. In this stage, the lens frame 4 is in an unlocked state without moving back and forth in the optical axis direction. FIG. 6B illustrates the position of the cam follower 31 in the rectilinear motion guide 11. Viewed from the direction orthogonal to the optical axis, the position of the cam follower 31 illustrated in a solid line and the position 31a are overlapped.

In step S103, when the cam ring 2 is further rotated, the cam follower 31 moves along the optical axis direction toward the image plane side according to the cam groove 21, and reaches the retraction position 31b indicated in a broken line in FIG. 6. Through the above operations, the retracting operation is completed, and the lens barrel has come into the state illustrated in FIGS. 3B and 5B.

In the present exemplary embodiment, the function of locking the rectilinear motion tube 3 in the imaging position to enhance the positional accuracy of the lens frame 4, and the function of retracting the rectilinear motion tube 3 along the optical axis direction to the retracted position can be realized only by the rotation force of the cam ring 2. Further, the lens frame 4 has been retracted in advance through the retracting operation. Accordingly, the interference between the rectilinear motion tube 3 and the lens frame 4 can be avoided. As a result, an occurrence of trouble such as the rack 41 overriding the thread of the feed screw 7 can be prevented.

According to the present exemplary embodiment, when capturing an image, the entire length of the rectilinear motion tube 3 is extended in the optical axis direction to be locked by the locking mechanism. As a result, tilting of the lens is less prone to occur, and lens holding accuracy can be enhanced while the travel distance of the lens can be sufficiently secured. In addition, when not capturing an image, the retracting operation is performed to store the lens barrel in the imaging apparatus main body. As a result, portability thereof is enhanced.

Next, referring to FIGS. 10A, 10B, and 11, a second exemplary embodiment of the present invention will be described. Components or portions similar to those described in the first exemplary embodiment are denoted by the same reference numerals and not described in detail below. The different points from the first exemplary embodiment will be mainly described.

Figure 10A:
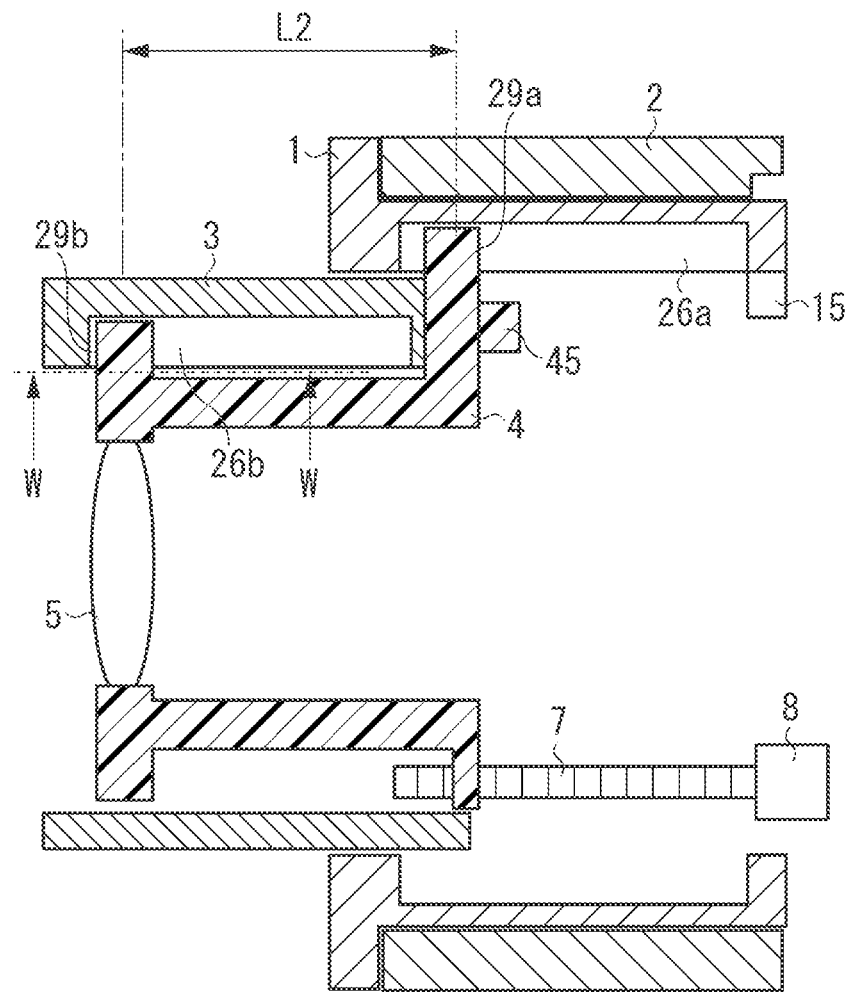
FIGS. 10A and 10B are cross sectional views illustrating a lens barrel according to a second exemplary embodiment of the present invention.
Figure 10B:
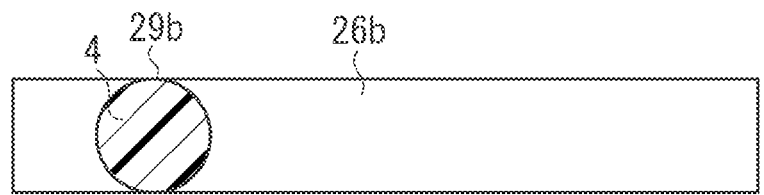

FIG. 10A is a cross sectional view cut along an optical axis illustrating a lens barrel according to the second exemplary embodiment, and FIG. 10B is an arrow view viewed from an arrow W direction illustrated in FIG. 10A.

A first guide groove 26a formed on the inner circumference surface of the stationary tube 1 is a first guide portion extended in a direction parallel with the optical axis direction. A second guide groove 26b formed on the inner circumference surface of the rectilinear motion tube 3 is a second guide portion extended in a direction parallel with the optical axis direction. A second guided portion 29b guided by the second guide groove 26b protrudes outside from the outer peripheral surface of the lens frame 4 at the front end portion thereof. The second guided portion 29b is a fitting portion fitting to the second guide groove 26b with a small gap therebetween so that the lens frame 4 can move back and forth in the optical axis direction. A first guided portion 29a guided by the first guide groove 26a protrudes outside from the outer peripheral surface of the lens frame 4 at the rear end portion thereof. The first guided portion 29a is a fitting portion fitting to the first guide groove 26a with a small gap therebetween so that the lens frame 4 can move back and forth in the optical axis direction.

FIG. 10B illustrates an example fitting relationship between the second guide groove 26b and the second guided portion 29b. The second guided portion 29b is a roller in a circular cylindrical shape, and the movement of the second guided portion 29b in the up-and-down direction in the drawing surface of FIG. 10B is restricted by the second guide groove 26b. Referring to FIG. 10A, the movement of the second guided portion 29b in a direction orthogonal to the drawing surface of FIG. 10A is restricted. The first guided portion 29a similarly has a circular cylindrical shape (not illustrated), and the movement of the first guided portion 29a in a direction orthogonal to the drawing surface of FIG. 10A is restricted by the first guide groove 26a. The lens frame 4 is movable along the first guide groove 26a and the second guide groove 26b in the optical axis direction. As illustrated in FIG. 10A, the first guided portion 29a and the second guided portion 29b have a positional relationship separated in the optical axis direction. As the distance between the first guided portion 29a and the second guided portion 29b is longer (see L2), the lens 5 held by the lens frame 4 is less easily tilted in a direction around the axis orthogonal to the drawing surface of FIG. 10A.

Figure 11:
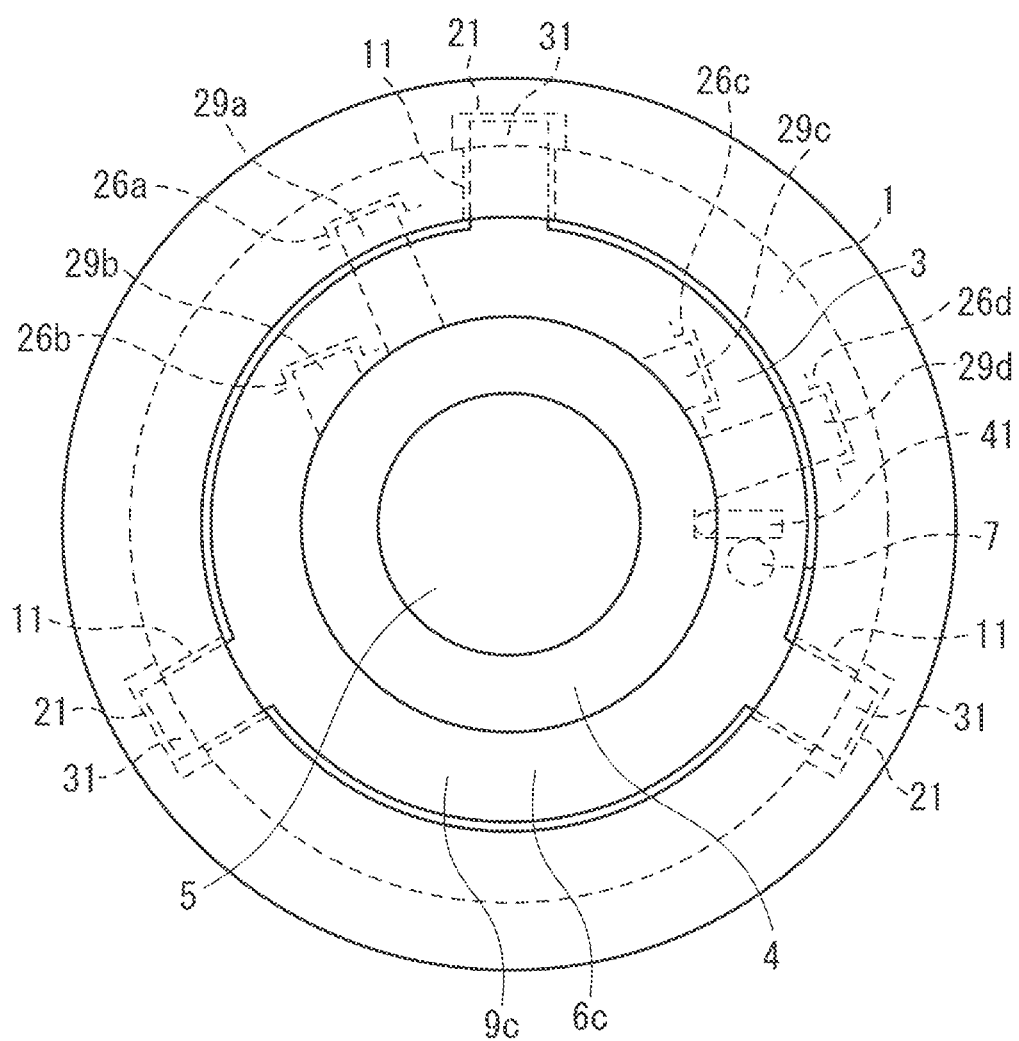
FIG. 11 is a front view illustrating a lens barrel according to the second exemplary embodiment of the present invention.

FIG. 11 is a front view of the lens barrel according to the present exemplary embodiment. FIG. 11 illustrates a phase relationship in a circumferential direction around the optical axis between the first guide groove 26a and the second guide groove 26b, and further illustrates a phase relationship between a third guide groove 26c and a fourth guide groove 26d. Seen from the optical axis direction, the third guide groove 26c and the fourth guide groove 26d are arranged at positions separated in a circumferential direction by phase angles of nearly 90 degrees respectively from the angle positions at which the first guide groove 26a and the second guide groove 26b are arranged. The third guide groove 26c formed on the inner circumference surface of the rectilinear motion tube 3 is a guide portion extended in a direction parallel with the optical axis direction. A third guided portion 29c guided by the third guide groove 26c protrudes outside from the outer peripheral surface of the lens frame 4 at the front end portion thereof, and is a fitting portion fitting to the third guide groove 26c with a small gap therebetween so that the lens frame 4 can move back and forth in the optical axis direction. Further, the fourth guide groove 26d formed on the inner circumference surface of the stationary tube 1 is a guide portion extended in a direction parallel with the optical axis direction. A fourth guided portion 29d guided by the fourth guide groove 26d protrudes outside from the outer peripheral surface of the lens frame 4 at the rear end portion thereof, and is a fitting portion fitting to the fourth guide groove 26d with a small gap therebetween so that the lens frame 4 can move back and forth in the optical axis direction.

As described above, seen from the optical axis direction, the third guide groove 26c and the fourth guide groove 26d are arranged to be in a phase relationship orthogonal with each other around the optical axis direction respectively with respect to the first guide groove 26a and the second guide groove 26b. The four guided portions provided on the lens frame 4 are respectively guided by the four guide grooves. Therefore, the lens 5 can move back and forth in a plane orthogonal to the optical axis without tilting.

According to the second exemplary embodiment, similar effect to that of the first exemplary embodiment can be obtained without using a plurality of guide bars extending in the optical axis direction.

In the present exemplary embodiment, the retractable lens structure using the cam ring 2 is exemplified, however, it is not limited thereto, and the present invention can be applied to lens barrels having various types of retractable lens structures.

Referring to FIG. 12 to FIGS. 21A, 21B, and 21C, a lens barrel according to a third exemplary embodiment of the present invention will be described. The lens barrel may be attachable/detachable to/from a digital camera as an imaging apparatus, or may be integrally mounted with a digital camera.

<Structure>

Figure 12:
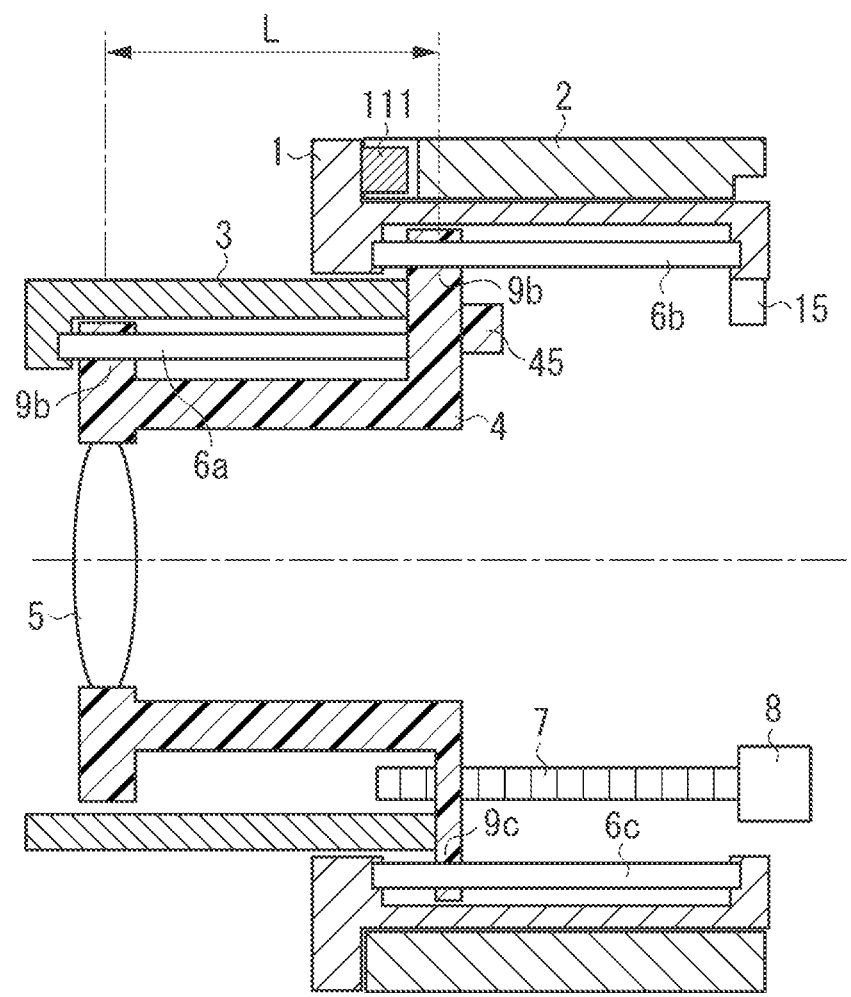
FIG. 12 is a cross sectional view of a lens barrel including an optical axis when capturing an image according to a third exemplary embodiment of the present invention.
Figure 15A:
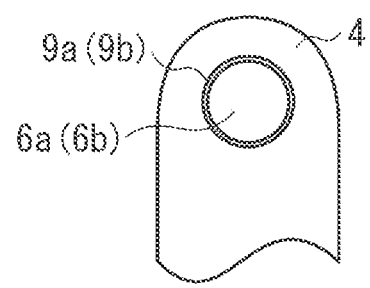
FIGS. 15A and 15B are cross sectional views illustrating a fitting state of a cam ring and a guide bar according to the third exemplary embodiment of the present invention.
Figure 15B:
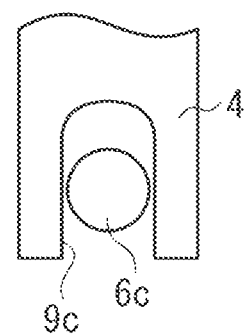

FIG. 12 is a cross sectional view of a lens barrel including an optical axis in a use state according to the third exemplary embodiment. On the drawing surface of FIG. 12, the left side is the object side, and the right side is the image plane side. The stationary barrel 1 is a stationary barrel in the lens barrel. The cam ring 2 is attached to the stationary tube 1 to be rotatable around the optical axis. The cam ring 2 is rotatable between a folding side stopper 211 and an extending side stopper 212 (see FIG. 13). A rotation stopper 111 is attached to the stationary tube 1 by using, for example, screws (not illustrated) after the cam ring 2 is inserted. The cam ring 2 is rotated by s drive source such as a motor (not illustrated). For example, when a stepping motor is used as the drive source, the rotation amount of the cam ring 2 can be controlled using the pulse count value. The movement of the cam ring 2 in the optical axis direction is, when all the time including not capturing an image or capturing an image, restricted, as illustrated in FIGS. 15A and 15B, by the bayonet claw 13 of the stationary tube 1 (see FIG. 14) in a state incorporated in a product. The rectilinear motion guides 11 each configuring a rectilinear motion guide are provided in the stationary tube 1 (see FIGS. 13 and 14). The rectilinear motion guides 11 are grooves provided along the optical axis, and restrict the cam followers 31, which also function as rectilinear motion keys configuring the rectilinear motion key portions, from rotating around the optical axis. By providing three rectilinear motion guides 11 in a circumferential direction, all the movement to the directions other than the optical axis direction can be restricted. In the third exemplary embodiment, the cam followers 31 also function as the rectilinear motion keys, however, the cam followers and the rectilinear motion keys can be constituted at different positions. The cam followers 31 constituting the cam follower portions are provided on the rectilinear motion tube 3. The cam followers 31 are provided at three positions corresponding to the rectilinear motion guides 11. The cam followers 31 also contact (engage) the respective cam grooves 21 constituting the cam portions along the rectilinear motion guides 11, and move the rectilinear motion tube 3 back and forth along the cam grooves 21 in the optical axis direction with the rotation of the cam ring 2.

Figure 13:
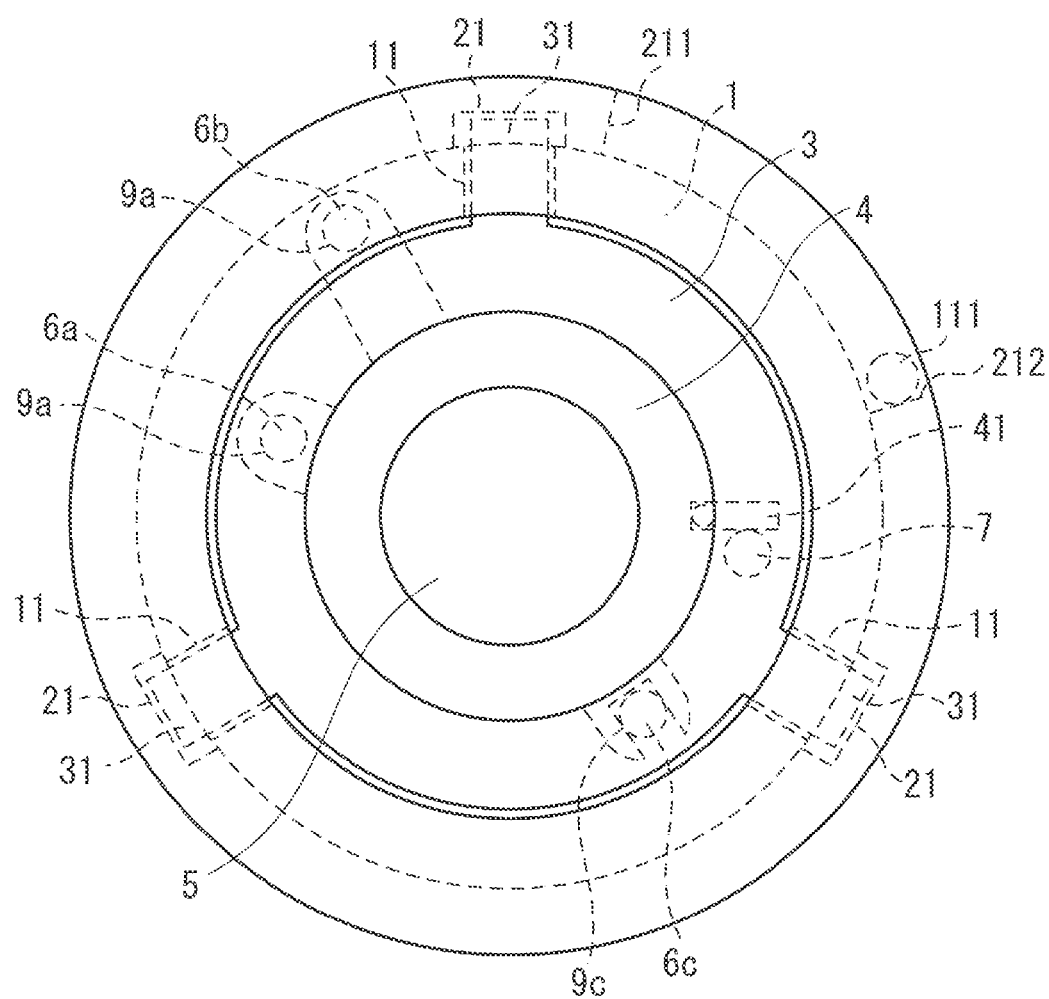
FIG. 13 is a front view of the lens barrel according to the third exemplary embodiment of the present invention.
Figure 14:
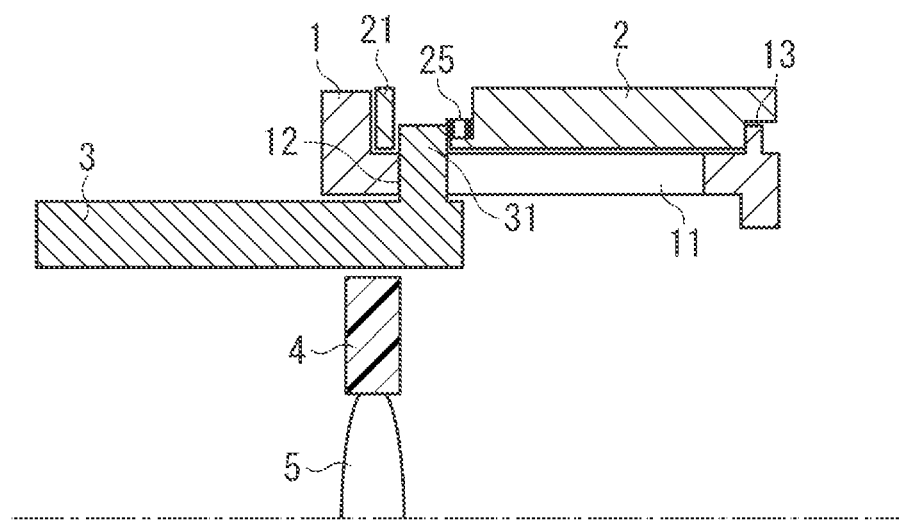
FIG. 14 is a cross sectional view of a cam structure including the optical axis when capturing an image according to the third exemplary embodiment of the present invention.

The main guide bar 6a constituting the second guide portion has a circular cylindrical shape made of stainless steel or the like, is attached to the rectilinear motion tube 3, and held to extend in a direction parallel with the optical axis direction. The main guide bar 6b (first guide portion) and the sub guide bar 6c (guide portion) are attached to the stationary tube 1, and held to extend in a direction parallel with the optical axis. The arrangement of the main guide bar 6a, the main guide bar 6b, and the sub guide bar 6c will be described with reference to FIG. 13. Referring to FIG. 13, the main guide bar 6a and the main guide bar 6b are disposes at different phase positions on a circle. The parts to which the main guide bar 6a and the main guide bar 6b are fixed are different, so that arrangement distances from the center of the optical axis are different. The reason of this structure is that it is difficult to arrange the main guide bar 6a and the main guide bar 6b to be overlapped in the front view to realize a retractable structure. By arranging the sub guide bar 6c at a position as far as possible from the main guide bar 6a and the main guide bar 6b, rotational backlash of the lens frame 4 around the optical axis can be reduced. The first fitting portion 9a is a fitting portion fitted with the main guide bar 6a to restrict the movement of the lens frame 4 in a circular plane orthogonal to the optical axis so that the lens frame 4, which is a part of the optical member, can move back and forth in the optical axis direction. Similarly, the second fitting portion 9b is a fitting portion fitted with the main guide bar 6b to restrict the movement of the lens frame 4 in the circular plane orthogonal to the optical axis so that the lens frame 4 can move back and forth in the optical axis direction. FIG. 15A illustrates the first fitting portion 9a and the second fitting portion 9b seen in a plane orthogonal to the optical axis. The movement of the first fitting portion 9a and the second fitting portion 9b is restricted in the circular plane orthogonal to the optical axis by the main guide bar 6a and the main guide bar 6b, and the lens frame 4 is guided in the optical axis direction. In addition, as illustrated in FIG. 12, the first fitting portion 9a and the second fitting portion 9b are arranged at separated positions in the optical axis direction. As the separation distance L (see FIG. 12) is longer, the lens 5, which is a part of the optical member provided in the lens frame 4, is less prone to tilt with respect to the main guide bar 6a and the main guide bar 6b. The third fitting portion 9c is a fitting portion fitted with the sub guide bar 6c with a small gap so that the lens frame 4 can move back and forth in the optical axis direction. In many cases, in order to avoid the multiple fittings with the first fitting portion 9a and the second fitting portion 9b, the third fitting portion 9c is brought into a fitting state in which the lens frame 4 is only restricted to rotate around the optical axis. Specifically, as illustrated in FIG. 15B, the third fitting portion 9c is configured to be guided in a direction for restricting the rotation in the plane orthogonal to the optical axis. With this structure, decentering in the plane orthogonal to the optical axis can be reduced. As described above, by using three guide bars, the lens 5 provided in the lens frame 4 is less prone to be decentered and tilted with respect to the optical axis direction, and can move back and forth in the optical axis direction while maintaining the optical axis holding accuracy.

Figure 16A:
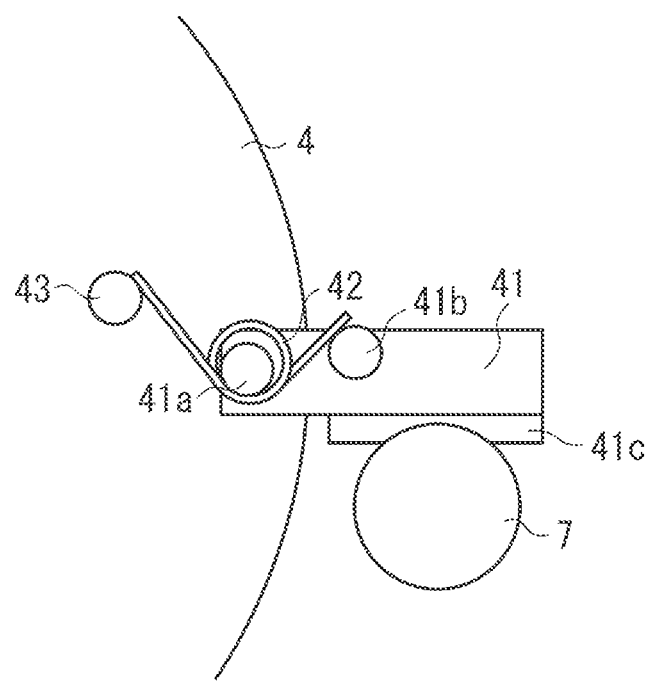
FIGS. 16A and 16B are diagrams illustrating a portion near a rack in detail according to the third exemplary embodiment of the present invention.
Figure 16B:
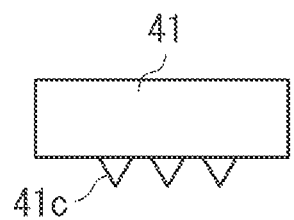

Next, mechanism elements for moving the lens frame 4 back and forth in the optical axis direction will be described. The rack 41 is provided on the lens frame 4. Referring to FIGS. 16A and 16B, the structure around the rack 41 will be described in detail. The rack 41 is rotatable around the optical axis with the rotation shaft 41a as a supporting point. In the optical axis direction, the lens frame 4 and the rack 41 are movable together. The torsion spring 42 urges to rotate the rack 41 clockwise on the drawing surface In FIG. 16A. At the contact portion of the rack 41 and the feed screw 7, as illustrated in FIG. 16B, the threaded portion 41c is formed. The pitch of the threaded portion 41c is set to be the same as the screw-pitch of the feed screw 7, and the rack 41 and the feed screw 7 are screwed together. The feed screw 7 is provided on the rotation shaft of the motor 8 (see FIG. 12), and the feed screw 7 is rotated together with the rotation of the motor 8. With the configuration described above, the rack 41 configures a driving mechanism for not restricting the lens frame 4 from moving in an in-plane direction orthogonal to the optical axis to allow the lens frame 4 to move back and forth only in the optical axis direction. As a result, the lens frame 4 can move back and forth in the optical axis direction without being interfered with the restriction by the fitting with the guide bars 6a to 6c. In the present exemplary embodiment, a stepping motor is used as the motor 8, for example, and by counting the number of pulses, the relative movement amount in the optical axis direction can be detected. Referring to FIG. 12, the position detection unit 15 such as a photointerrupter can detect a position where the light-shielding portion 45 overlaps the position detection unit 15 in the optical axis direction. By using the position detection unit 15 and the light-shielding portion 45, the absolute position of the lens frame 4 in the optical axis direction can be detected. As described above, by counting the number of pulses of the motor 8 after detecting the absolute position of the lens frame 4 in the optical axis direction, the position of the lens frame 4 in the optical axis direction can be detected at any time.

<Locking Mechanism>

Figure 17A:
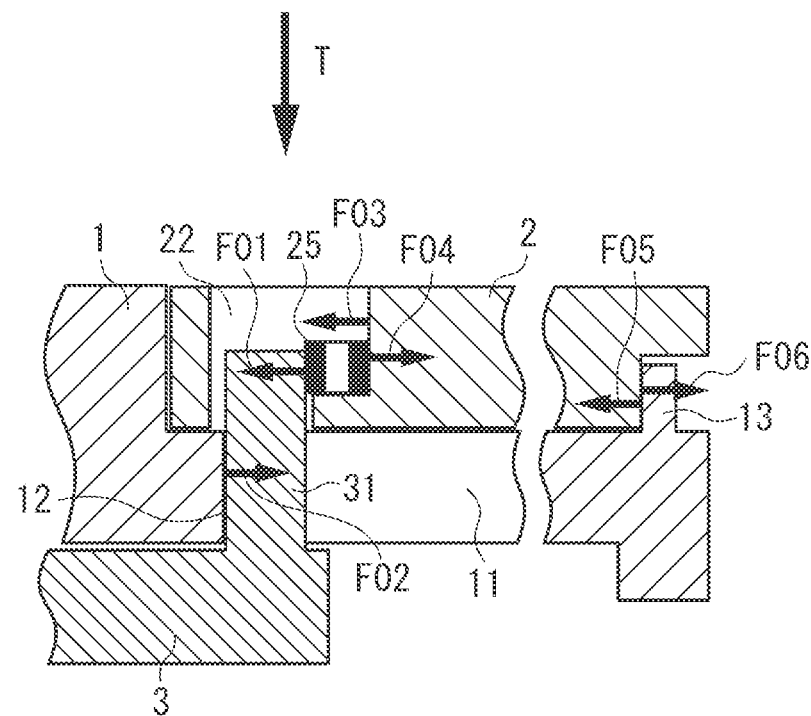
FIGS. 17A and 17B are diagrams illustrating in detail a portion near a locking spring according to the third exemplary embodiment of the present invention.
Figure 17B:
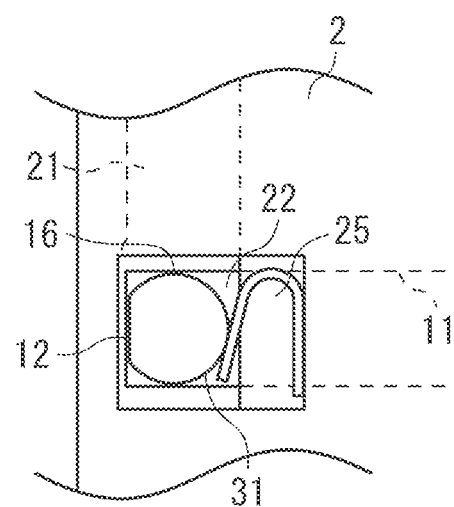

The locking mechanism includes a structure for locking the rectilinear motion tube 3 in the extended state to stabilize the relative positional accuracy between the main guide bar 6a and the main guide bar 6b. The locking mechanism will be described in detail below. FIG. 17A is a cross sectional view along the optical axis direction in a state where the rectilinear motion tube 3 in the imaging state is locked. The locking spring 25 is a urging member made of Special Use Stainless steel (SUS), for example, and attached to the cam groove 21 of the cam ring 2 by screwing or bonding (not illustrated). The through hole portion 22 is provided through the cam ring 2 so that the locking spring 25 can be easily inserted. FIG. 17B is a top view viewed from T direction in FIG. 17A, i.e., from the upper side in FIG. 17A. As illustrated in FIG. 17B, the locking spring 25 is formed in U-shape, and urges the cam follower 31 in a direction in which the U-shape is opened in a state where the barrel is locked. The balance of the urging forces will be described with reference to FIG. 17A. The locking spring 25 generates forces of F01 and F02 in the opening direction of the U-shape. F01 acts on the cam follower 31, the cam follower 31 contacts the abutting face portion 12, which configures a contact portion, and the cam follower 31 receives reaction force F03 from the stationary tube 1. On the other hand, F02 acts on the cam ring 2, and caused by F02, the cam ring 2 receives the reaction force F04 at the bayonet claw 13 from the stationary tube 1. The reaction force F03 and the reaction force F04 act on the stationary tube 1 in the opposite directions to each other to be balanced.

As illustrated in FIG. 17B, the cam follower 31 is not in a simple cylindrical shape, and the abutting face thereof to contact the abutting face portion 12 is formed to be flat. The abutting face portion 12 is processed in advance so that relative accuracy is secured as well as the rectilinear motion tube 3 and the stationary tube 1, and in a state where the cam follower 31 is pressed against the abutting face portion 12, the relative accuracy between the main guide bar 6a and the main guide bar 6b is secured. In the present exemplary embodiment, the cam followers 31 are arranged circumferentially at three separate positions, and therefore the locking springs 25 are arranged respectively at three positions in the corresponding phases. The cam followers 31 are respectively pressed to the three abutting face portions 12, and thereby, the thrust-direction positions of the stationary tube 1 and the rectilinear motion tube 3 are definitely determined. With this configuration, the fluctuation of the relative tilting between the stationary tube 1 and the rectilinear motion tube 3 can be reduced. As described above, in an imaging state, the attitude accuracy in tilting and shifting of the main guide bar 6a and the main guide bar 6b is secured. As a result, the lens frame 4 can move back and forth in the optical axis direction accurately.

<Extending and Locking Operations>

Figure 18A:
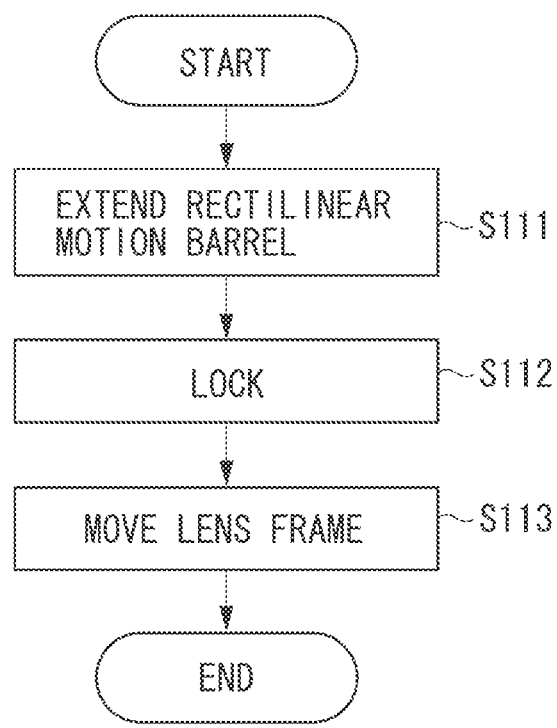
FIGS. 18A and 18B are flowcharts illustrating extending and retracting operations according to the third exemplary embodiment of the present invention.

Next, referring to a flowchart illustrated in FIG. 18A, a flow from a non-imaging state to a ready-for-imaging state in which the rectilinear motion tube 3 is extended and locked by the locking springs 25, will be described. In step S111, the cam ring 2 is rotated counterclockwise seen from the opposite side of an object, in whole range of the second cam region (regions 202 in FIGS. 21A, 21B, and C). The rectilinear motion tube 3 is extended by means of the rotation of the cam ring 2, and comes into the state illustrated in FIG. 19A. In this state, the rectilinear motion tube 3 is not locked, and therefore the rectilinear motion tube 3 has backlash with respect to the stationary tube 1. In step S112, the cam ring 2 is further rotated to cover whole range of the first cam region (regions 201 in FIGS. 21A, 21B, and 21C). In the first cam region, the rectilinear motion tube 3 does not move back and forth. The locking spring 25 is brought into contact with the cam follower 31 by the rotation of the locking spring 25 caused by the rotation of the cam ring 2, from the state where the cam follower 31 and the locking spring 25 are not in contact with each other. Further, after rotation in the whole second cam region, the locking spring 25 is charged by a certain amount. As a result, as illustrated in FIG. 17A, F01 and F02 are generated, and the relative position of the stationary tube 1 and the rectilinear motion tube 3 is in a locked state. Through the sequence described above, the lens frame 4 is in a holding state in which the lens frame 4 can move back and forth in the optical axis direction. The step S113 indicates a sequence in which the motor 8 can be driven to move the lens frame 4 to a desired position according to the zoom state and the focus state of the lens barrel, for example. As described above, when capturing an image, the entire length of the lens barrel is extended and locked to improve the holding accuracy of the lens such as tilting, and the optical performance can be maintained in high level. Further, in a non-image capturing state, portability is enhanced by retracting the lens barrel to reduce the size. In the present exemplary embodiment, the lens frame 4 whose holding accuracy is to be held is supported by the main guide bar 6a and the main guide bar 6b. However, even if the rectilinear motion tube 3 and the lens frame 4 are integrally formed, similar effect can be achieved.

<Lock Release and Retracting Operations>

Figure 19A:
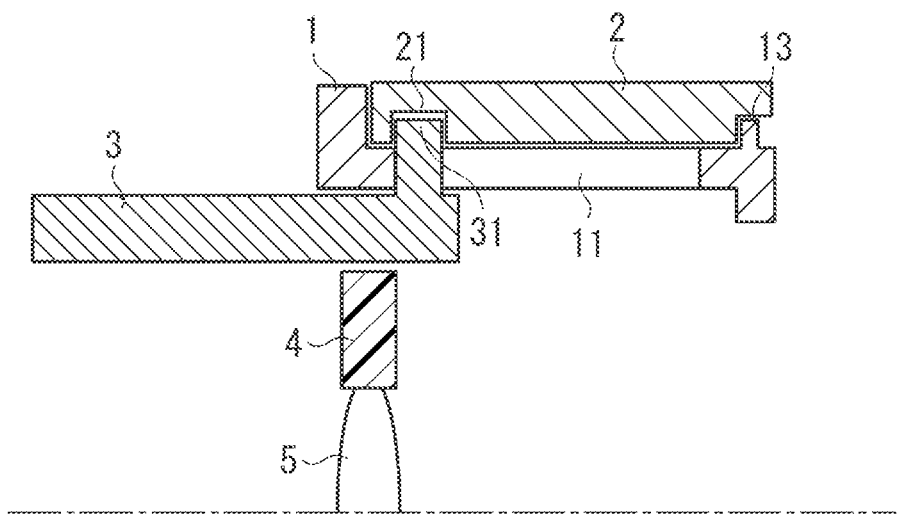
FIGS. 19A and 19B are cross sectional views of a cam structure including an optical axis illustrating a retracting operation according to the third exemplary embodiment of the present invention.
Figure 20A:
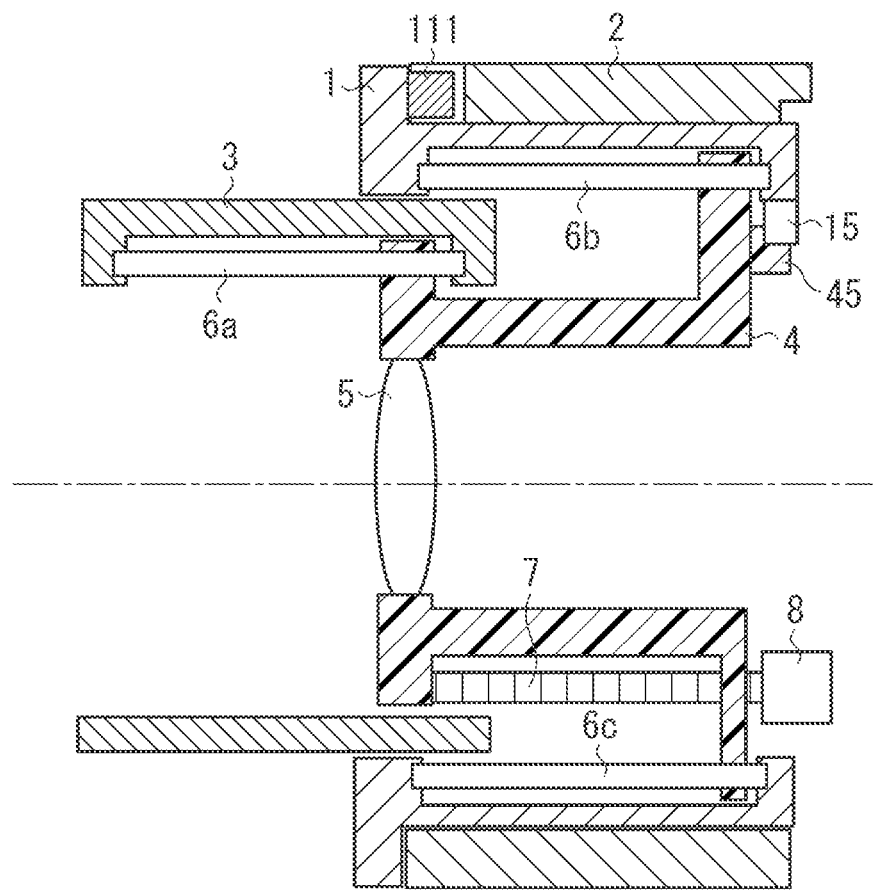
FIGS. 20A and 20B are cross sectional views of the lens barrel including the optical axis illustrating a retracting operation according to the third exemplary embodiment.

Next, referring to a flowchart in FIG. 18B, the retracting operation will be described. At the start point of the sequence, the lens barrel is in a state ready for imaging. The sequence of the retracting operation of the lens barrel until the lens barrel comes into the non-imaging state, will be described. In step S101, the motor 8 is operated to move the lens frame 4 to a position closest to the image plane. FIGS. 19A and 20A are cross sectional views illustrating states of the lens barrel at that time. Since the position of the lens frame 4 is detected by the pulse count value of the motor 8, the motor 8 can be driven according to the required pulse count value to move the lens frame 4. Further, in the present exemplary embodiment, the position detection unit 15 is disposed on the near side to the image plane. Therefore, even if any deviation in the pulse count information of the motor 8 occurs by some reason, the relationship between the pulse count value and the absolute position can be corrected by the drive control unit recognizing the absolute position of the lens frame 4 in the optical axis direction at the time the lens frame 4 has come near to the image plane.

Figure 18B:
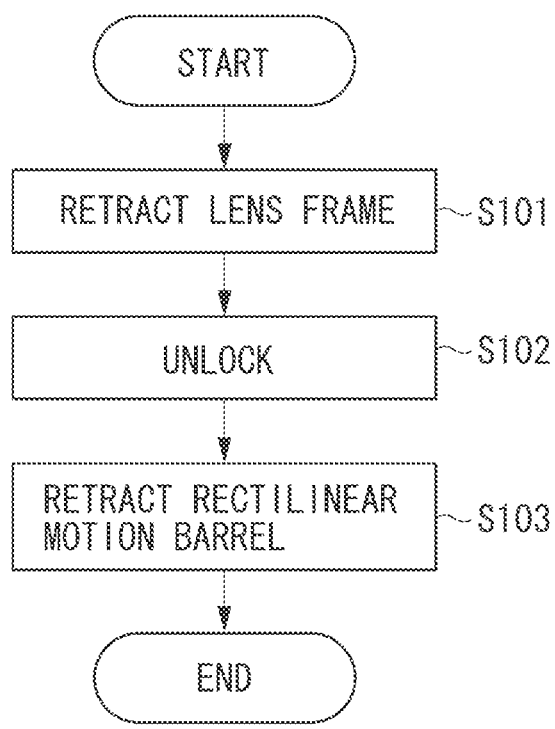

Next, in step S102 of FIG. 18B, the cam ring 2 is rotated to release the lock. Referring to FIG. 21, the operation to release the lock will be described. In the imaging state, as illustrated in FIG. 21A, the cam follower 31 is urged by the locking spring 25, and locked. From this state, the cam ring 2 is rotated counterclockwise seen from the opposite side of the object, the state returns to the state illustrated in FIG. 21B. The cam follower 31 is separated from the locking spring 25 and not urged thereby. In the first cam region 201, the cam groove 21 is orthogonal to the optical axis direction. Therefore, the cam follower 31 does not move substantially back and forth in the optical axis direction. In the first cam region 201, the torque to move the rectilinear motion tube back and forth is not required, and only the torque for resisting the frictional force generated by the urging of the locking spring 25 is required.

Next, in step S103 in FIG. 18B, the cam ring 2 is rotated to retract the rectilinear motion tube 3. From the state in FIG. 21B, the cam ring 2 is further rotated to move the cam follower 31 to an opposite side of the object along the optical axis, and the cam ring 2 is further rotated to come into the state illustrated in FIG. 21C. As a result, in the second cam region 202, the rectilinear motion tube 3 is retracted. In this region, since the locking spring 25 does not act on, only the torque for moving the rectilinear motion tube 3 back and forth is required.

Figure 19B:
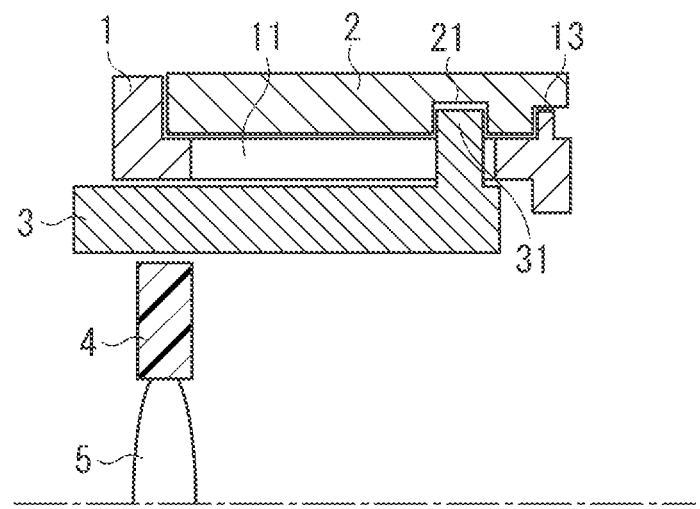
Figure 20B:
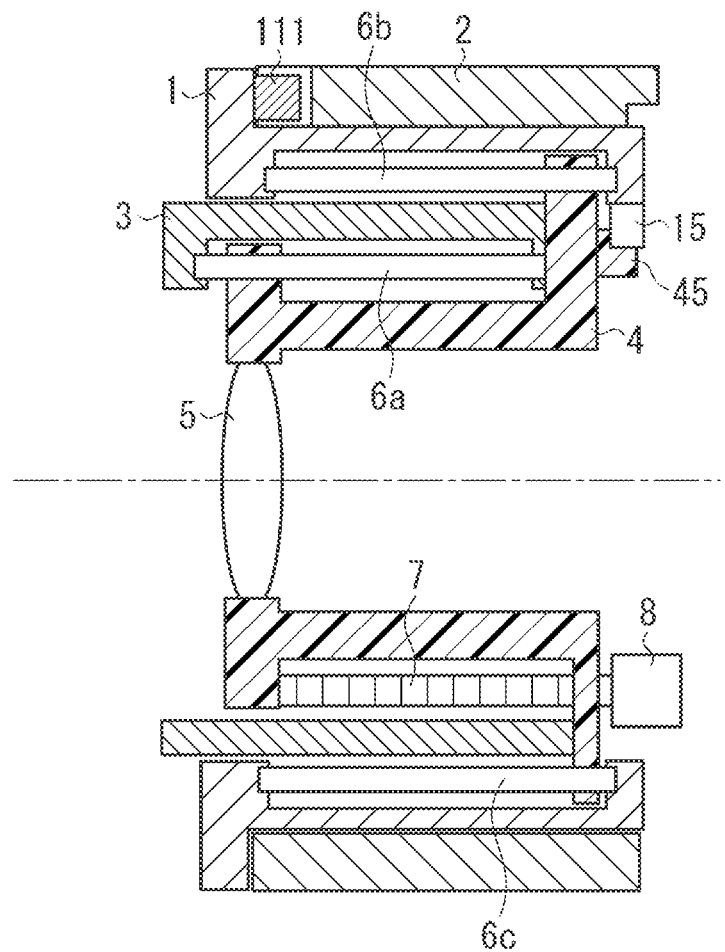

As described above, the retracting operation is completed, and the lens barrel has come in the state illustrated in FIGS. 19B and 20B. Through the above-described operation, the function of locking the rectilinear motion tube 3 in the imaging position to enhance the attitude accuracy of the tilting and shifting of the lens frame 4, and the function of retracting the rectilinear motion tube 3 along the optical axis direction to the retracted position can be realized only by the rotation of the cam ring 2. By directly pressing the rectilinear motion tube 3 and the stationary tube 1 not via other members, higher positional accuracy can be achieved. Further, the lens frame 4 has been retracted in advance. Accordingly, the interference between the rectilinear motion tube 3 and the lens frame 4 can be avoided. As a result, an occurrence of trouble such as the rack 41 overriding the thread of the feed screw 7 can be prevented.

Figure 22:
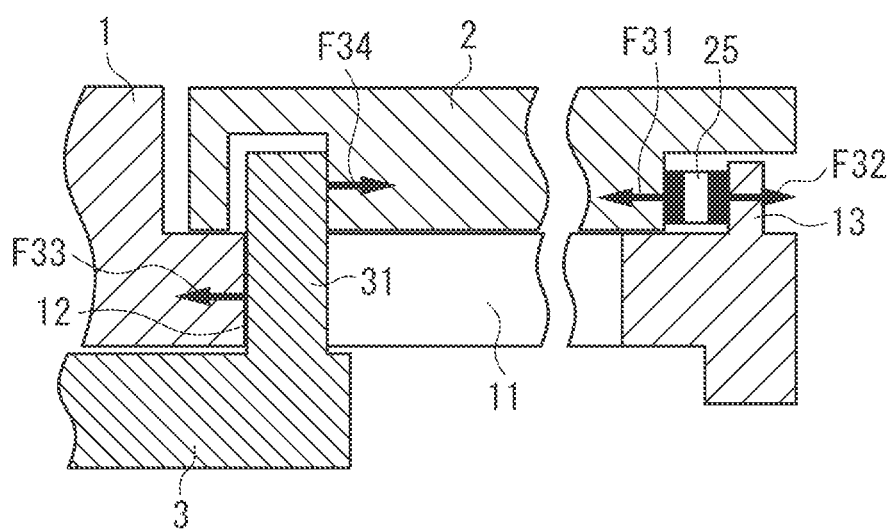
FIG. 22 is a diagram illustrating in detail a portion near a locking spring according to a fourth exemplary embodiment of the present invention.

Next, referring to FIG. 22, a fourth exemplary embodiment of the present invention will be described.

The description of the configuration similar to that of the third exemplary embodiment is omitted, and only the characteristic items in the present exemplary embodiment will be described. FIG. 22 is a sectional view illustrating in detail a locking portion of the lens barrel in a use state. The locking spring 25 is arranged between the cam ring 2 and the bayonet claw 13, and attached to the cam ring 2. Further, the through hole portion 22 described in the first exemplary embodiment is not provided. Therefore, the structure in the locked state around the cam follower 31 is simpler. With this configuration, in the space around the cam follower 31, parts are not concentrated. Therefore, enough flexibility for designing the locking spring 25 can be secured. The locking spring 25 generates a urging force between the cam ring 2 and the bayonet claw 13 provided on the stationary tube 1, and acts on as indicated by F31 and F32. F31 is balanced in the cam ring 2 with the reaction force F34 received from the cam follower 31. On the other hand, F32 is balanced in the stationary tube 1 with the reaction force F33 received from the cam follower 31. The retracting sequence is illustrated in FIG. 18B like that of the third exemplary embodiment. Different points will be described below with reference to FIGS. 23A to 23C. FIG. 23A illustrates a use state, the cam ring 2 is located in the first cam region 201, and the locking spring 25 and the bayonet claw 13 are locked. FIG. 23B illustrates a state in which the cam ring 2 is rotated a little, and the lock is release. When the cam ring 2 is further rotated, as illustrated in FIG. 23C, the cam follower 31 moves to the retracted position while the lock is kept released, and the retracting operation is completed.

Through the operation described above, attitude accuracy of tiling and shifting of the extended rectilinear motion tube 3 when capturing an image can be enhanced to maintain the optical performance to be high. In addition, in a non-image capturing state, portability can be enhanced due to the reduced size.

Next, a fifth exemplary embodiment of the present invention will be described with reference to FIGS. 24A, 24B, 25A, 25B, 25C, and 25D.

Figure 24A:
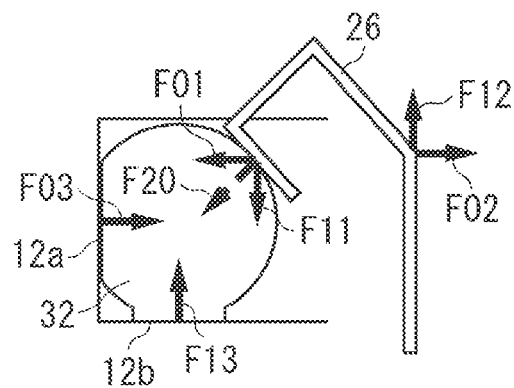
Figure 24B:
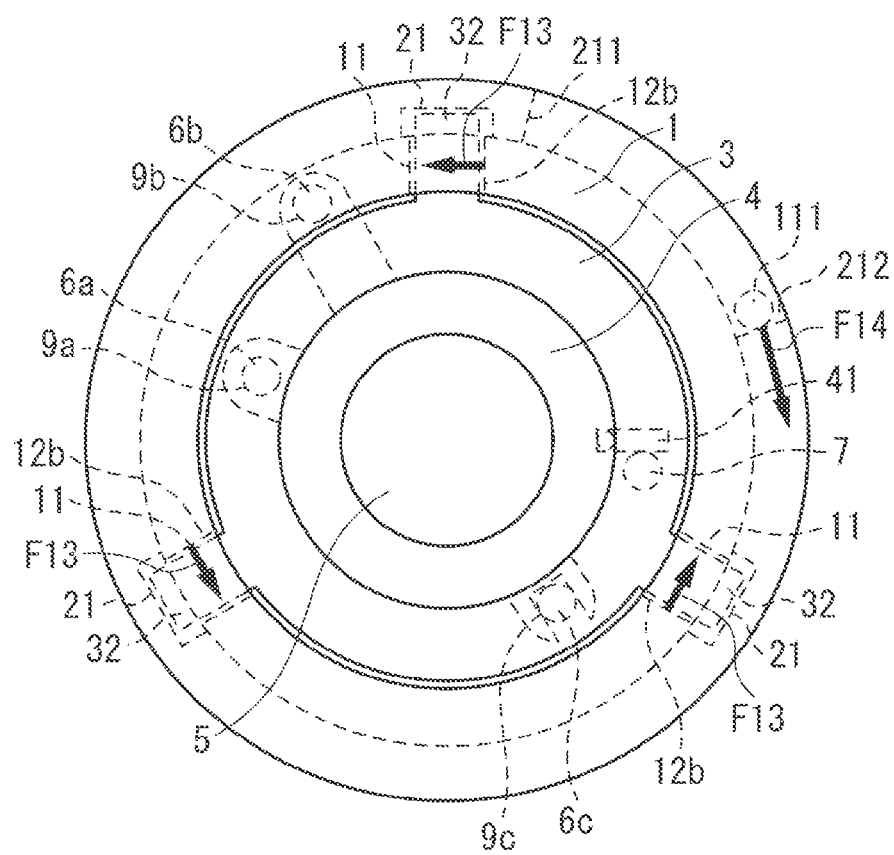
Figure 25A:
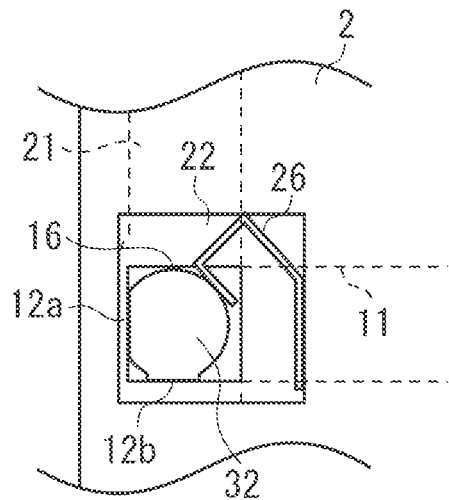
Figures 25B, 25C, 25D:
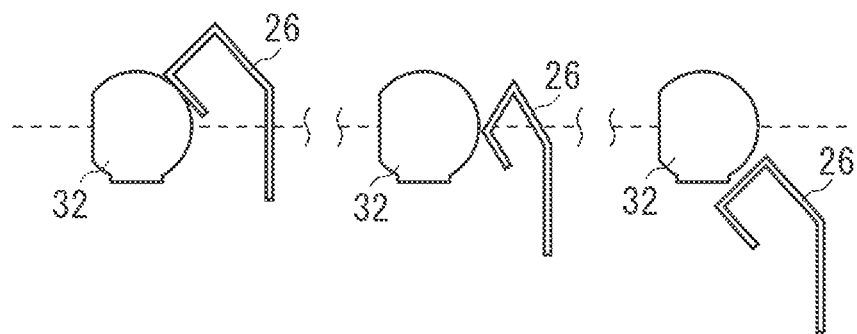

The description of the configuration similar to that of the first exemplary embodiment is omitted, and only the characteristic items in the present exemplary embodiment will be described. FIG. 25A is a top view seen from a T direction illustrated in FIG. 27A. A locking spring 26 is not in simple U-shape like that of the third exemplary embodiment, and the tip end thereof is pinched. A cam follower 32 has two planar portions as illustrated in FIG. 24A, so that the cam follower 32 can contact two portions of an abutting face portion 12a configuring a first contact portion, and an abutting face portion 12b configuring a second contact portion having different abutting direction from that of the first contact portion. The locking spring 26 generates a urging force in lower left direction in the drawing surface of FIG. 25A, and both the abutting face portions 12a and 12b are in contact with the cam follower 32. The balance of forces will be described below. There are three locking springs 26 which is the same in number as the cam followers 32. With this configuration, the rectilinear motion tube 3 is fixed not only in the optical axis direction but also in the plane orthogonal to the optical axis. Therefore, the positional accuracy of the rectilinear motion tube 3 can be secured with respect to the stationary tube 1 in decentering direction relative to the optical axis. FIG. 25B and FIG. 25D each illustrate a state where the locking spring 26 deforms according to the rotation of the cam ring 2. FIG. 25B illustrates a state where the rectilinear motion tube 3 is locked. Next, FIG. 25C illustrates a state where the cam ring is rotated a little, and the locking spring 26 is deformed and on the way to override the cam follower 32. Then, as illustrated in FIG. 25D, the locking spring 26 has overridden the cam follower 32, and the deformation is released to be in a shape of the free state. Next, the balance of forces in a state where the rectilinear motion tube 3 is locked will be described. FIG. 24A illustrates forces generated in a locked state. From the locking spring 26, a force is generated in F20 direction. The force is divided into F01 and F11 as component forces. F01 and F11 are component forces generated in both abutting directions against the abutting face portion 12a and the abutting face portion 12b. The balance of forces in the optical axis direction like F01 is the same as that of the first exemplary embodiment, so that the description thereof is omitted. The balance of forces in the direction orthogonal to the optical axis like F11 will be described below. The locking spring 26 is fixed to the cam ring 2 to generate forces of F11 and F12. F11 acts on the cam follower 32 to cause the cam follower 32 to contact the abutting face portion 12b, and the cam follower 32 receives the reaction force F13 from the stationary tube 1. On the other hand, F12 acts on the cam ring 2, and an extending side stopper 212 receives reaction force F14 from the rotation stopper 111 provided on the stationary tube 1, as illustrated in FIG. 24B. The reaction force F13 and the reaction force F14 act on the stationary tube 1 in the opposite directions to be balanced.

With the configuration described above, attitude accuracy of tiling and shifting in all directions of the extended rectilinear motion tube 3 when capturing an image can be enhanced to maintain the optical performance to be high. In addition, in a non-image capturing state, portability can be enhanced due to the reduced size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-006890, filed Jan. 18, 2013, and NO. 2013-032013, filed Feb. 21, 2013, which are hereby incorporated by reference herein in their entirety.

What is claimed is:

1. A lens barrel comprising:
a lens holding member;
a first lens barrel holding a first guide member; and
a second lens barrel holding a second guide member,
wherein one end of the lens holding member is held by the first guide member, and the other end of the lens holding member is held by the second guide member,
wherein the second guide member protrudes on an object side with respect to the first guide member in an optical axis direction with a shift from a retracted state to a ready for imaging state,
wherein, in the ready for imaging state, the lens holding member moves in the optical axis direction guided by the first guide member and the second guide member which protrudes to the object side from the first guide member, and
wherein the second guide member extends outside of the first lens barrel in the direction normal to the optical axis in the ready for imaging state.

2. The lens barrel according to claim 1, wherein, in the ready for imaging state, the first guide member and the second guide member which protrudes from the first guide member to the object side are positioned in the optical axis direction.

3. The lens barrel according to claim 1, further comprising a rotation restriction member to restrict rotation of the lens holding member around the optical axis,
wherein, seen from the optical axis direction, the first guide member and the second guide member are disposed on the same side with respect to the optical axis, and
wherein, seen from the optical axis direction, the rotation restriction member is disposed on an opposite side of the first guide member and the second guide member with respect to the optical axis.

4. A lens barrel comprising:
a lens holding member;
a first lens barrel holding a first guide bar; and
a second lens barrel holding a second guide bar,
wherein one end of the lens holding member is held by the first guide bar, and the other end of the lens holding member is held by the second guide bar,
wherein the second guide bar protrudes on an object side with respect to the first guide bar in an optical axis direction with a shift from a retracted state to a ready for imaging state,
wherein, in the ready for imaging state, the lens holding member moves in the optical axis direction guided by the first guide bar and the second guide bar which protrudes to the object side from the first guide member, and
wherein the second guide member extends outside of the first lens barrel in the direction normal to the optical axis in the ready for imaging state.

5. The lens barrel according to claim 4, wherein, in the ready for imaging state, the first guide bar and the second guide bar which protrudes from the first guide bar to the object side are positioned in the optical axis direction.

6. The lens barrel according to claim 4, further comprising a rotation restriction bar configured to restrict rotation of the lens holding member around the optical axis,
wherein, seen from the optical axis direction, the first guide bar and the second guide bar are disposed on the same side with respect to the optical axis, and
wherein, seen from the optical axis direction, the rotation restriction bar is disposed on an opposite side of the first guide bar and the second guide bar with respect to the optical axis.

7. An imaging apparatus comprising:
a lens holding member;
a first lens barrel holding a first guide bar; and
a second lens barrel holding a second guide bar,
wherein one end of the lens holding member is held by the first guide bar, and the other end of the lens holding member is held by the second guide bar,
wherein the second guide bar protrudes on an object side with respect to the first guide bar in an optical axis direction with a shift from a retracted state to a ready for imaging state,
wherein, in the ready for imaging state, the lens holding member moves in the optical axis direction guided by the first guide bar and the second guide bar which protrudes to the object side from the first guide member, and
wherein the second guide member extends outside of the first lens barrel in the direction normal to the optical axis in the ready for imaging state.

8. An imaging apparatus comprising:
a lens holding member;
a first lens barrel holding a first guide member; and
a second lens barrel holding a second guide member, wherein one holding portion of the lens holding member is held by the first guide member, and the other holding portion of the lens holding member is held by the second guide member, wherein the second guide member protrudes on an object side with respect to the first guide member in an optical axis direction with a shift from a retracted state to a ready for imaging state, and wherein the second guide member extends outside of the first lens barrel in the direction normal to the optical axis in the ready for imaging state.

\* \* \* \* \*